(12) United States Patent
Lauer et al.

(10) Patent No.: US 9,973,262 B2
(45) Date of Patent: May 15, 2018

(54) DATA DELIVERY TO DEVICES ON VEHICLES USING MULTIPLE FORWARD LINKS

(71) Applicant: GOGO LLC, Chicago, IL (US)

(72) Inventors: Bryan Adrian Lauer, Chicago, IL (US); Rukmani Loganathan, Bartlett, IL (US); Sajit Sasi, Burr Ridge, IL (US); Patrick J. Walsh, Naperville, IL (US); Anand Chari, Naperville, IL (US)

(73) Assignee: GOGO LLC, Chicago, IL (US)

( * ) Notice: Subject to any disclaimer, the term of this patent is extended or adjusted under 35 U.S.C. 154(b) by 0 days. days.

(21) Appl. No.: 15/459,709

(22) Filed: Mar. 15, 2017

(65) Prior Publication Data

US 2017/0195039 A1    Jul. 6, 2017

Related U.S. Application Data

(63) Continuation of application No. 14/876,542, filed on Oct. 6, 2015, now Pat. No. 9,634,753, which is a
(Continued)

(51) Int. Cl.
*H04W 4/00* (2018.01)
*H04B 7/185* (2006.01)
(Continued)

(52) U.S. Cl.
CPC ..... *H04B 7/18506* (2013.01); *H04B 7/18508* (2013.01); *H04W 40/02* (2013.01); *H04W 84/005* (2013.01); *H04W 84/06* (2013.01)

(58) Field of Classification Search
CPC ........... H04B 7/18506; H04B 7/18508; H04W 40/02; H04W 84/06; H04W 84/005
(Continued)

(56) References Cited

U.S. PATENT DOCUMENTS 5,546,397 A    8/1996 Mahany
5,557,656 A    9/1996 Ray et al.
(Continued)

FOREIGN PATENT DOCUMENTS

CN    1868175 A    11/2006
EP    0 902 551 A2    3/1999
(Continued)

OTHER PUBLICATIONS

Second Office Action, Chinese Patent Application No. 201480061088.6, dated Jun. 19, 2017.
(Continued)

*Primary Examiner* — Khai M Nguyen
(74) *Attorney, Agent, or Firm* — Marshall, Gerstein & Borun LLP; Randall G. Rueth

(57) ABSTRACT

Data content that is to be utilized, as a whole, at a target device on-board a vehicle is apportioned for delivery onto the vehicle via multiple forward links, each of which is included in a different frequency band and/or used a different protocol. A mapping or selection of a specific portion of the data content for a specific forward link may based on a data content type of the specific portion, as well as on other dynamic or static criteria. The target device may operate on the subsets of the data content as it receives each subset. Thus, time critical/foundational portions of the data content may be delivered using a faster forward link, larger elements of the data content may be delivered using a higher-bandwidth forward link, and/or portions of the data content requiring a higher degree of accuracy may be delivered using a more robust forward link, for example.

19 Claims, 10 Drawing Sheets

Related U.S. Application Data continuation of application No. 14/225,050, filed on Mar. 25, 2014, now Pat. No. 9,197,314.

(60) Provisional application No. 61/901,644, filed on Nov. 8, 2013.

(51) Int. Cl.
*H04W 40/02* (2009.01)
*H04W 84/06* (2009.01)
*H04W 84/00* (2009.01)

(58) Field of Classification Search
USPC .................................. 455/431, 435.1, 435.2
See application file for complete search history.

(56) References Cited

U.S. PATENT DOCUMENTS

| | | | |
|---|---|---|---|
| 5,652,795 | A | 7/1997 | Dillon et al. |
| 5,699,384 | A | 12/1997 | Dillon |
| 5,722,074 | A | 2/1998 | Muszynski |
| 5,740,366 | A | 4/1998 | Mahany et al. |
| 5,844,893 | A | 12/1998 | Gollnick et al. |
| 5,940,771 | A | 8/1999 | Gollnick et al. |
| 5,995,725 | A | 11/1999 | Dillon |
| 5,995,726 | A | 11/1999 | Dillon |
| 6,009,328 | A | 12/1999 | Muszynski |
| 6,016,388 | A | 1/2000 | Dillon |
| 6,122,514 | A | 9/2000 | Spaur et al. |
| 6,125,184 | A | 9/2000 | Dillon et al. |
| 6,131,160 | A | 10/2000 | Dillon et al. |
| 6,161,141 | A | 12/2000 | Dillon |
| 6,310,582 | B1 | 10/2001 | Uetake et al. |
| 6,374,311 | B1 | 4/2002 | Mahany et al. |
| 6,665,536 | B1 | 12/2003 | Mahany |
| 6,697,415 | B1 | 2/2004 | Mahany |
| 6,704,303 | B1 | 3/2004 | Bowman-Amuah |
| 6,714,559 | B1 | 3/2004 | Meier |
| 6,788,935 | B1 | 9/2004 | McKenna et al. |
| 6,810,527 | B1 | 10/2004 | Conrad et al. |
| 7,013,138 | B2 | 3/2006 | Mahany |
| 7,062,268 | B2 | 6/2006 | McKenna |
| 7,099,331 | B2 * | 8/2006 | Taylor ............... H04B 7/18519 370/395.41 |
| 7,107,062 | B2 | 9/2006 | Cruz et al. |
| 7,113,780 | B2 | 9/2006 | McKenna et al. |
| 7,242,931 | B2 | 7/2007 | Leuca et al. |
| 7,386,002 | B2 | 6/2008 | Meier |
| 7,457,646 | B2 | 11/2008 | Mahany et al. |
| 7,483,696 | B1 | 1/2009 | Mitchell |
| 7,535,921 | B2 | 5/2009 | Meier |
| 7,536,167 | B2 | 5/2009 | Gollnick et al. |
| 7,548,553 | B2 | 6/2009 | Meier |
| 7,558,569 | B2 | 7/2009 | Chang et al. |
| 7,636,552 | B2 | 12/2009 | Monk |
| 7,702,328 | B2 | 4/2010 | Lemond et al. |
| 7,710,907 | B2 | 5/2010 | Mahany |
| 7,715,853 | B1 | 5/2010 | Frerking et al. |
| 7,751,814 | B2 | 7/2010 | Cruz et al. |
| 7,873,343 | B2 | 1/2011 | Gollnick et al. |
| 7,916,747 | B2 | 3/2011 | Meier |
| RE42,536 | E | 7/2011 | Leuca et al. |
| 8,068,829 | B2 | 11/2011 | Lemond et al. |
| 8,078,163 | B2 | 12/2011 | Lemond et al. |
| 8,094,605 | B2 | 1/2012 | Lynch et al. |
| 8,169,946 | B2 | 5/2012 | Lynch et al. |
| 8,280,309 | B2 | 10/2012 | Monk |
| 8,358,971 | B2 | 1/2013 | Schiff |
| 8,452,276 | B2 | 5/2013 | Lauer |
| 8,499,324 | B1 * | 7/2013 | Mitchell ............ H04B 7/18508 709/219 |
| 8,646,010 | B2 | 2/2014 | Bengeult et al. |
| 9,363,991 | B2 | 6/2016 | Larson et al. |
| 9,369,991 | B2 | 6/2016 | Lauer et al. |
| 2002/0004401 | A1 | 1/2002 | Heppe et al. |
| 2002/0016164 | A1 | 2/2002 | Mead et al. |
| 2002/0087992 | A1 | 7/2002 | Bengeult et al. |
| 2002/0160773 | A1 | 10/2002 | Gresham et al. |
| 2002/0170060 | A1 | 11/2002 | Lyman |
| 2003/0041155 | A1 | 2/2003 | Nelson et al. |
| 2003/0214966 | A1 | 11/2003 | Taylor |
| 2004/0097192 | A1 | 5/2004 | Schiff |
| 2005/0053026 | A1 | 3/2005 | Mullan et al. |
| 2005/0077424 | A1 | 4/2005 | Schneider |
| 2005/0286452 | A1 | 12/2005 | Hardgrave et al. |
| 2006/0030311 | A1 | 2/2006 | Cruz et al. |
| 2006/0040612 | A1 | 2/2006 | Min |
| 2006/0229070 | A1 | 10/2006 | de La Chapelle et al. |
| 2006/0252422 | A1 | 11/2006 | Kauffman et al. |
| 2006/0281404 | A1 | 12/2006 | Lee et al. |
| 2007/0021117 | A1 | 1/2007 | McKenna et al. |
| 2007/0042772 | A1 | 2/2007 | Salkini et al. |
| 2008/0004016 | A1 | 1/2008 | Smee et al. |
| 2008/0115007 | A1 | 5/2008 | Jalali |
| 2008/0141314 | A1 | 6/2008 | Lemond et al. |
| 2008/0182573 | A1 | 7/2008 | Lauer et al. |
| 2008/0198997 | A1 | 8/2008 | Sterman et al. |
| 2008/0240029 | A1 | 10/2008 | Lynch et al. |
| 2008/0274734 | A1 | 11/2008 | Kostanic et al. |
| 2009/0070841 | A1 | 3/2009 | Buga et al. |
| 2009/0086611 | A1 | 4/2009 | Isshiki et al. |
| 2009/0096857 | A1 | 4/2009 | Frisco et al. |
| 2009/0183215 | A1 | 7/2009 | McCartie et al. |
| 2009/0279490 | A1 | 11/2009 | Alcorn |
| 2010/0035607 | A1 | 2/2010 | Horr et al. |
| 2010/0091660 | A1 | 4/2010 | Morita |
| 2010/0098034 | A1 | 4/2010 | Tang et al. |
| 2010/0099443 | A1 | 4/2010 | King et al. |
| 2010/0189089 | A1 | 7/2010 | Lynch et al. |
| 2011/0110515 | A1 * | 5/2011 | Tidwell ............ H04N 21/23109 380/200 |
| 2011/0116373 | A1 | 5/2011 | Lauer |
| 2011/0122811 | A1 | 5/2011 | Yuan et al. |
| 2011/0223926 | A1 | 9/2011 | Nakao et al. |
| 2011/0265128 | A1 * | 10/2011 | Bengeult ............ H04B 7/18508 725/64 |
| 2011/0314488 | A1 * | 12/2011 | Keen ................... H04B 7/18506 725/23 |
| 2013/0142045 | A1 | 6/2013 | Nakamura et al. |
| 2013/0195106 | A1 | 8/2013 | Calmon et al. |
| 2014/0052825 | A1 | 2/2014 | Luecke et al. |
| 2014/0156844 | A1 | 6/2014 | Cavgalar |
| 2014/0282684 | A1 | 9/2014 | Keen et al. |
| 2014/0282727 | A1 | 9/2014 | Keen et al. |
| 2015/0120416 | A1 * | 4/2015 | Davis ................. G06Q 30/0281 705/14.19 |
| 2015/0131512 | A1 | 5/2015 | Lauer et al. |
| 2015/0131513 | A1 | 5/2015 | Lauer et al. |
| 2015/0131519 | A1 | 5/2015 | Kanabar et al. |
| 2015/0318913 | A1 | 11/2015 | Lauer et al. |
| 2017/0238224 | A1 * | 8/2017 | McKibben ............ H04W 36/18 370/331 |

FOREIGN PATENT DOCUMENTS

| | | |
|---|---|---|
| EP | 1 976 152 A1 | 10/2008 |
| EP | 2 568 533 A1 | 3/2013 |
| JP | 2005-159873 A | 6/2005 |
| JP | 2007538460 A | 12/2007 |
| JP | 2008-135946 A | 6/2008 |
| JP | 2010213266 A | 9/2010 |
| JP | 2011205659 A | 10/2011 |
| JP | 2012-147050 A | 8/2012 |
| WO | WO-99/31821 A1 | 6/1999 |
| WO | WO-01/41317 A2 | 6/2001 |
| WO | WO-2008/045205 A2 | 4/2008 |
| WO | WO-2012/114728 A1 | 8/2012 |

OTHER PUBLICATIONS

The Notification of the Second Office Action, Chinese patent application No. 201480072544.7, dated Aug. 2, 2017.

(56) References Cited

OTHER PUBLICATIONS

"Aero Mobile Terminals: Models 2540/2532" Product Sheet, ViaSat, 2 pp. (2012).
"Direcway™ DW3000/DW4000 Series Systems: Satisfying the Need for Speed for the Multimedia Internet," Hughes Network Systems, 2 pp. (Jun. 2001).
"Exede® Internet: Fastest In-Flight Wi-Fi Unleash the Internet," ViaSat, 4 pp. (2012).
"Gogo Partners with AeroSat to Bring Ku-Satellite Service to Market," Gogo LLC, 2 pp. (May 18, 2012).
"Hughes and ThinKom Demonstrate New Tactical Communications Solutions," press release, Hughes Network Systems, LLC, 2 pp. (Oct. 25, 2012).
"Hughes HX200 Broadband Satellite Router," Hughes Network Systems, LLC, 2 pp. (2012).
ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).
European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).
European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).
International Search Report and Written Opinion in International Application No. PCT/US2014/064777 dated Feb. 23, 2015.
International Search Report and Written Opinion for Application No. PCT/US2014/064768, dated Mar. 16, 2015.
International Search Report and Written Opinion, International Application No. PCT/US2014/064797, dated Feb. 23, 2015.
International Search Report and Written Opinion for Application No. PCT/US2014/064826 dated Aug. 6, 2015.
Second Written Opinion, corresponding International Application No. PCT/US2014/064797, dated date Sep. 24, 2015.
International Search Report and Written Opinion, International Application No. PCT/US2014/064809, dated Feb. 26, 2015.
International Preliminary Report on Patentability (Chapter II), International Application No. PCT/US2014/064809, dated Jan. 18, 2016.
Office Action, Chinese Patent Application No. 201480061088.6, dated Dec. 30, 2016.
First Office Action, Chinese patent application No. 201480072544.7, dated Jan. 4, 2017.
Office Action, European Patent Application No. 14835641.3, dated Mar. 7, 2017.
First Office Action, Japanese Patent Application No. 2016-528909, dated Aug. 1, 2017.
Japanese Patent Application No. 2016/528898, Notice of Reasons for Refusal, dated Oct. 3, 2017.
Extended European Search Report in European Patent Application No. 17174240.6, dated Jun. 22, 2017.

* cited by examiner

DATA DELIVERY TO DEVICES ON VEHICLES USING MULTIPLE FORWARD LINKS

CROSS-REFERENCE TO RELATED APPLICATIONS

The present application is a continuation application that claims priority to and the benefit of the filing date of U.S. application Ser. No. 14/876,542, filed Oct. 6, 2015 and entitled "DATA DELIVERY TO DEVICES ON VEHICLES USING MULTIPLE FORWARD LINKS," which claims priority to and the benefit of U.S. application Ser. No. 14/225,050, filed Mar. 25, 2014 and entitled "DATA DELIVERY TO DEVICES ON VEHICLES USING MULTIPLE FORWARD LINKS," which claims priority to and the benefit of the filing date of U.S. Provisional Application No. 61/901,644 filed on Nov. 8, 2013 and entitled "DATA DELIVERY TO DEVICES ON VEHICLES USING MULTIPLE FORWARD LINKS," the entire contents of which are hereby incorporated herein. Additionally, the present application is related to U.S. patent application Ser. No. 14/225,077 entitled "OPTIMIZING USAGE OF MODEMS FOR DATA DELIVERY TO DEVICES ON VEHICLES" and filed on Mar. 25, 2014, and co-pending U.S. patent application Ser. No. 14/225,017 entitled "HYBRID COMMUNICATIONS FOR DEVICES ON VEHICLES" and filed on Mar. 25, 2014, the contents of which are hereby incorporated by reference in their entirety.

Still further, the present application is related to co-pending U.S. patent application Ser. No. 13/675,200 entitled "VEHICLE DATA DISTRIBUTION SYSTEM AND METHOD" and filed on Nov. 13, 2012, co-pending U.S. patent application Ser. No. 13/675,194 entitled "COMMUNICATIONS SYSTEM AND METHOD FOR NODES ASSOCIATED WITH A VEHICLE" and filed on Nov. 13, 2012, and co-pending U.S. patent application Ser. No. 13/675,190 entitled "GROUND SYSTEM FOR VEHICLE DATA DISTRIBUTION" and filed on Nov. 13, 2012. The entire contents of these related applications are hereby incorporated by reference in their entireties.

FIELD AND BACKGROUND OF THE DISCLOSURE

Technical Field

The instant disclosure generally relates to delivering communications to and from devices that are on-board vehicles, and, in particular, to a system that utilizes one or more forward links and reverse links in different frequency bands to deliver communications to and from the on-board devices.

Background

Some existing airlines and other transportation companies provide services, such as Wi-Fi or other data delivery services, to a device that is on-board a vehicle while the vehicle is traveling en route to a destination. The on-board device may be, for example, a device that is fixedly connected to the vehicle (e.g., a device that is included in a Line Replaceable Unit (LRU) on an aircraft), or the on-board device may be a mobile computing device such as a smart phone, tablet or laptop computing device that is temporarily being transported by the vehicle. To establish communications for services to such on-board devices, providers often utilize a wireless communication link such as a direct Air-to-Ground (ATG) link or a satellite link over which communications or data is delivered to and from the vehicle. The wireless communication link is typically a bi-directional communication link over which all forward data (i.e., data delivered to the vehicle) and all reverse data (i.e., data sent from the vehicle) is transmitted and received.

In certain circumstances, the bi-directional communication link on which an on-board data service depends can be unavailable (e.g., when the vehicle travels to a location that is outside of network coverage), slow or busy (e.g., with a queue of pending upload requests), or malfunctioning, thus rendering the on-board data services unavailable to or unusable by the devices. Further, because all communications for the set of devices that are on-board a vehicle typically traverse the same bi-directional link, the download or upload behavior of certain data content types, data files, etc. can appear inconsistent to users of the service. For example, messages or communications sent by a device might appear to have zero latency while the arrival of requested content at the device appears to be significantly delayed. Moreover, the allocated spectrum of certain bi-directional communication links is limited, and constraints, such as those imposed by hardware modems, protocols or regulatory bodies, may further limit the bandwidth and/or throughput that can be established, thus leading to a less than optimal user experience.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, a method of distributively delivering content to devices being transported by vehicles may include obtaining, at a hybrid communications distributor disposed in a terrestrial location, content that is to be delivered to a device. The device may be a mobile computing device that is temporarily being transported by a vehicle that is in-flight. The method may also include selecting at least one of (i) a first forward link included in a first wireless communication link supported by a first frequency band, or (ii) a second forward link included in a second wireless communication link supported by a second frequency band, and causing a first transmission to be sent to the in-flight vehicle using the first forward link. The first transmission may include a first portion of the content, for example. Additionally, the method may include causing a second transmission to be sent to the in-flight vehicle using the second forward link, and the second transmission may include a second portion of the content.

An embodiment of a system for distributively delivering content to devices that are being transported by vehicles may include a hybrid communications distributor that is communicatively connected to a vehicle via a plurality of forward links while the vehicle is in-flight. Each forward link of the plurality of forward links may use a different respective wireless communication protocol, and the hybrid communications distributor may include one or more processors and one or more non-transitory, tangible computer-readable storage media storing computer-executable instructions. The computer-executable instructions, when executed by the one or more processors, may cause the hybrid communications distributor to obtain content that is to be presented, as a whole, at a user interface of a device being transported by the in-flight vehicle. The computer-executable instructions, when executed by the one or more processors, may cause the hybrid communications distributor to cause a first transmission to be sent to the in-flight vehicle using a first forward link of the plurality of forward links, where the first forward link is included in a first communication link, and the first transmission includes a first portion of the content that is to be presented, as a whole, at the user interface of the device. The computer-executable instructions, when executed by the one or more processors, may cause the hybrid communications distributor to cause a second transmission to be sent to the in-flight vehicle using a second forward link of the plurality of forward links, where the second forward link is included in a second communication link, and the second transmission includes a second portion of the content that is to be presented, as a whole, at the user interface of the device.

An embodiment of a method of receiving distributed content at devices being transported by vehicles may include receiving, at a vehicle via a first forward link of a plurality of forward links configured to wirelessly deliver data to the vehicle, a first transmission including a first portion of information that is to be displayed, as a whole, at a user interface of a device. The device may be a mobile computing device that is temporarily being transported by a vehicle, and the first forward link may be included in a first wireless communication link supported by a first frequency band. The method may also include causing, by a processor of a hybrid communications collector fixedly connected to the vehicle, the first portion of the information that is to be displayed, as a whole, at the user interface of the device to be sent to the device using a wireless network contained within the vehicle. Additionally, the method may include receiving, at the vehicle via a second forward link of the plurality of forward links, a subsequent transmission including a second portion of the information that is to displayed at a user interface of the device; and causing the second portion of the information that is to be displayed, as a whole, at the user interface of the device to be sent to the device using the wireless network contained within the vehicle. The first portion of the information to be displayed at the user interface of the device may be a first selected portion, the second portion of the information to be displayed at the user interface of the device may be a second selected portion, the first forward link may be a first selected forward link, and/or the second forward link may be a second selected forward link.

DETAILED DESCRIPTION

Figure 1:
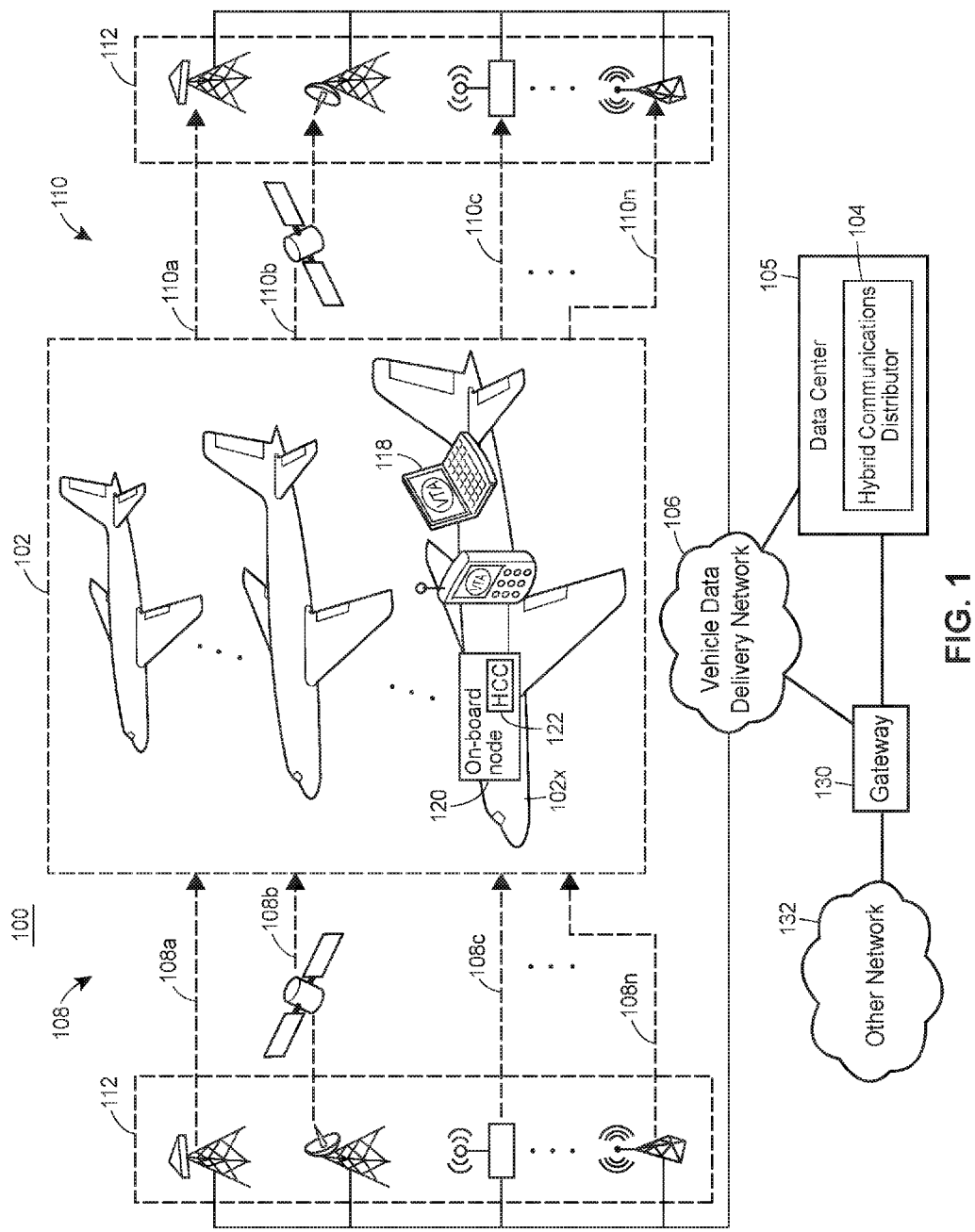
FIG. 1 illustrates an exemplary hybrid communications system for delivering data to and from devices that are on-board a set of vehicles.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Additionally, any or all of the contents of the present disclosure may operate in conjunction with any or all of the contents of the disclosure of co-pending U.S. patent application Ser. No. 13/675,200 entitled "VEHICLE DATA DISTRIBUTION SYSTEM AND METHOD," the contents of which are hereby incorporated by reference in their entirety. Further, any or all of the contents of the present disclosure may operate in conjunction with any or all of the contents of the disclosure of co-pending U.S. patent application Ser. No. 13/675,194 entitled "COMMUNICATIONS SYSTEM AND METHOD FOR NODES ASSOCIATED WITH A VEHICLE, the contents of which are hereby incorporated by reference in their entirety, and any or all of the contents of the present disclosure may operate in conjunction with any or all of the contents of the disclosure of co-pending U.S. patent application Ser. No. 13/675,190 entitled "GROUND SYSTEM FOR VEHICLE DATA DISTRIBUTION," the contents of which are hereby incorporated by reference in their entirety.

Still further, any or all of the contents of the present disclosure may operate in conjunction with any or all of the contents of the disclosures of co-pending U.S. patent application Ser. No. 14/225,077 entitled "OPTIMIZING USAGE OF MODEMS FOR DATA DELIVERY TO DEVICES ON VEHICLES" and co-pending U.S. patent application Ser. No. 14/225,017 entitled "HYBRID COMMUNICATIONS FOR DEVICES ON VEHICLES", the contents of which are hereby incorporated by reference in their entireties.

FIG. 1 is a block diagram depicting an example hybrid communications system 100 for communicating information or data to and from devices that are being transported by the vehicles 102. The system 100 is configured to deliver data or information to a specific device on-board one of the vehicles 102 (e.g., the device 118 on-board the vehicle 102x) from a data center 105 or from a hybrid communications distributor 104 included in the data center 105. In some implementations, the hybrid communications system 100 is configured to deliver feedback information from the vehicle 102x to the data center 105 or the hybrid communications distributor 104, and the data center 105 or the hybrid communications distributor 104 may use the feedback information to inform a subsequent data delivery to the on-board device 118 or to other on-board devices. In an embodiment, the hybrid communications distributor 104 and the data center 105 are communicatively connected to the vehicles 102 via one or more vehicle data delivery networks 106, one or more forward links 108, and one or more reverse links 110.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 102 may be communicatively connected to the data center 105 via one or more forward wireless communication links 108 and one or more reverse wireless communication links 110. The links 108, 110 may be collectively supported by a multiplicity of radio frequency (RF) bands. Typically, a particular frequency band or portion of RF spectrum supporting the links 108, 110 is allocated (e.g., by a governmental or regulatory body) for a particular type of wireless communications such as satellite communications, ham-radio communications, terrestrial cellular communications, near-field wireless communications, and the like. In some allocated frequency bands, the wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem that is fixedly connected to a vehicle 102x may be tuned to a particular frequency band, and thus, along with a respective antenna, may serve as one end of a communication link over which data may be received onto and/or sent from the vehicle 102x. Similarly, a transceiver or modem that is fixedly connected to a structure 112 external to the vehicle 102x may also be tuned to the particular frequency band, and thus, along with a respective antenna, may serve as the other end of the communication link over which the data is received onto and/or sent from the vehicle 102x. The structure 112 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 1, the representations of the structures 112 are duplicated to more clearly illustrate the forward links 108 and reverse links 110, however, in practice, each structure 112 may be a unitary structure having a single physical transceiver or modem mounted thereon that services both the respective forward link 108 and the respective reverse link 110. For example, a teleport 112b may include a transceiver that services both the satellite forward link 108b and the satellite reverse link 110b of a particular frequency band allocated for satellite communications. In some instances, a single structure 112 may include multiple transceivers or modems, each of which may be tuned to a different frequency band.

With further regard to the structures 112, in addition to having a transceiver or modem supporting one end of a particular communication link 108, 110 to the vehicle 102x, each structure 112 may include another interface via which a communication path 115 to the hybrid communications distributor 104 at the data center 105 may be communicatively connected. The interface to the communication path 115 may be a wired or a wireless communications interface.

A vehicle 102x may include one or more fixedly connected modems or transceivers to support one or more communication links 108, 110 over one or more frequency bands, and the vehicle 102x may utilize these modems or transceivers to receive data onto the vehicle 102x and/or to transmit data from the vehicle 102x. For example, a vehicle 102x may include thereon a transceiver or modem tuned to a frequency band that is allocated for direct communications between vehicles 102 and ground stations, or on which a direct air-to-ground (ATG) communication link is supported (e.g., 849-851 MHz and 894-896 MHz). Such an ATG communication link is denoted in FIG. 1 by the forward link 108a and the reverse link110a. A vehicle 102x may additionally or alternatively include thereon a transceiver or modem tuned to a frequency band that is allocated for satellite communications (denoted in FIG. 1 by the forward link 108b and the reverse link110b), such as the L band (e.g., 40 to 60 GHz or 1 to 2 GHz), the $K_u$ band (e.g., 12-18 GHz), the $K_a$ band (e.g., 26.5-40 GHz), and/or other spectrum that is allocated for satellite communications.

Other examples of communication links that may be established with the vehicle 102x include terrestrial mobile or cellular communication links (denoted in FIG. 1 by the references108c/110c), e.g., communication links that support TDMA (Time Division Multiple Access), GSM (Global System for Mobile Communications), CDMA (Code Division Multiple Access), Wi-MAX (Worldwide Interoperability for Microwave Access), LTE (Long Term Evolution), and/or other terrestrial mobile communications technologies. Yet another example of a type of communication link that may be established with the vehicle 102x is wireless local area network (WLAN) or Wi-Fi™ link supported on a Wi-Fi allocated frequency band (e.g., 2.4 and/or 5 GHz), and using a protocol corresponding to an IEEE (Institute of Electrical and Electronics Engineers) 802.11 standard, as denoted in FIG. 1 by reference 108c for a Wi-Fi forward link and reference 110c for a Wi-Fi reverse link. Still other examples types of wireless communication links that may be established with the vehicle 102x include infrared, microwave, or other optically-based or line-of-sight wireless communication links. It is clear, however, that any suitable wireless communication link including a forward and/or reverse link may support communications between the data center 105 or the hybrid communications distributor 104 and a vehicle 102x.

In an embodiment, one or more of the transceivers or modems fixedly connected to the vehicle 102x may be operated in a unidirectional mode, while one or more other transceivers or modems fixedly connected to the vehicle 102x may be operated in a bi-directional mode. For example, a transceiver or modem on the vehicle 102x that is tuned to a satellite communications spectrum may utilized in a receive-only mode, while another transceiver or modem on the vehicle 102x that is tuned to an ATG communications spectrum may be utilized in both receive and transmit modes.

Turning now to the hybrid communications distributor 104 included in the data center 105 of the system 100, the hybrid communications distributor 104 may comprise, in an embodiment, a set of computer executable instructions that are stored on one or more non-transitory, tangible, computer-readable storage media (e.g., one or more memories or data storage entities), and that are executable by one or more processors of the data center 105. (The data center 105 generally includes one or more computing devices having processors, and is described in more detail in a later section of the present disclosure.) The hybrid communications distributor 104 may manage data or information delivery, e.g., over the links 108 and 110, to and from a device 118 that is being transported by a vehicle 102x.

The device 118 may be a device that is fixedly connected to the vehicle 102x (e.g., a computing device that is included in a Line Replaceable Unit (LRU) on an aircraft), or the device may be a mobile device such as a smart phone, tablet or laptop that is temporarily being transported by the vehicle, e.g., a mobile computing device belonging to a passenger on-board the vehicle. In an embodiment, the device 118 is a computing device including at least one memory and at least one processor, and optionally, at least one user interface and at least one wireless network interface. As used herein, the terms "target device," "recipient device," and "device" are used interchangeably to refer to a device 118 that is on-board a vehicle or being transported by the vehicle, and to which data that is external to the vehicle is to be electronically delivered.

The data that is to be delivered to the device 118 may include any type of data. For example, the data may include user-consumable content data such as a text message, a web page, a media file, streaming data, and/or a response to a previous request received at a user interface of the device 118. In some cases, the data that is to be delivered to the device 118 includes data that is to be presented at a user interface of the device 118. In some scenarios, the data that is to be delivered to the device 118 may be an application, a configuration, an update, or software that the user of the device 118 has requested to be downloaded.

In an embodiment, the hybrid communications distributor 104 may select one of the forward links 108 that are supported by respective one or more allocated frequency bands for delivery of data or information to the device 118, and the hybrid communications distributor 104 may receive feedback data or information from the vehicle 102x over a reverse link 110 supported by a different allocated frequency band. For example, the hybrid communications distributor 104 may select, from the links 108, one particular forward link that is supported by a particular frequency band for forward data delivery to the device 118, e.g., the satellite communications forward link 108b. The hybrid communications distributor 104 may receive feedback information from the vehicle 102x via a particular reverse link, from the links 110, that is supported by a frequency band other than the particular frequency band over which the forward data was delivered, e.g., the ATG reverse link 110a. In some embodiments, the particular reverse link may be selected from the set of reverse links 110. Accordingly, in this embodiment, a forward link and a reverse link of different frequency bands are paired or associated for data delivery purposes.

At least because forward link and reverse links are supported by different frequency bands, a different messaging protocol and/or delivery scheme (e.g., broadcast, multicast, unicast) may be used for sending information to the vehicles 102 than is used for receiving feedback information from the vehicles 102. For instance, a broadband protocol may be utilized to deliver data over a selected forward link 108b, and a point-to-point protocol may be utilized to deliver data over a reverse link 108a. Additionally or alternatively, the hybrid communications distributor 104 may cause transmissions to be multicast over a forward link 108b, and may receive feedback information over a reverse link 108a in a unicast format. Such differing frequency bands, messaging protocols, and/or delivery schemes across the forward links 108 and the reverse links 108 and the selection(s) thereof may allow the hybrid communications system 100 to efficiently utilize available spectrum while, at the same time, adhering to existing modem constraints and/or regulatory requirements.

In an embodiment, the hybrid communications distributor 104 may select more than one forward link from the links 108 (each of which may be supported by a different frequency band) for distributed or hybrid delivery of data or information that is to be received, as a whole, at the device 118 on-board the vehicle 102x. For instance, the hybrid communications distributor 104 may select both the satellite communications forward link 108b and the ATG forward link 108a to deliver forward data, as a whole, to the device 118, and a first portion of the data may be delivered using the satellite forward link 108b while a second portion of the data may be delivered using the ATG forward link 108a. In some cases, more than two forward links 108 may be selected for distributed data delivery to the vehicle 102x. In this example, the hybrid communications distributor 104 may receive feedback information from the vehicle 102x via a reverse link that is included in the same frequency band as one of the selected forward links, e.g., the satellite communications reverse link 110b or the ATG reverse link 110a. Alternatively, the hybrid communications distributor 104 may receive feedback information from the vehicle 102x via a reverse link that is not included in the same frequency band as any of the selected forward links, e.g., the reverse link 110c.

Thus, in view of the above, in general the hybrid communications distributor 104 may utilize any suitable combination of selected forward links 108, reverse links 110, messaging protocols, and/or delivery schemes to transmit data to and receive feedback information from the vehicles 102 in a distributed or hybrid manner. The hybrid communications distributor 104 and its selection and usage of the one or more forward link(s) 108 and the reverse link(s) 110, messaging protocols, and/or delivery schemes for data delivery between the hybrid communications distributor 104 and the on-board devices 118 is discussed in more detail in later sections of this disclosure.

Turning now to the vehicles 102, some or all of the vehicles 102 (e.g., the vehicle 102x) may each include a respective on-board node 120 to manage data that is received onto the vehicle 102x and that is intended for delivery to a particular on-board device 118. The on-board node 120 may also manage data that is generated by the on-board devices 118 and that is to be transmitted from the vehicle 102x, in an implementation. Further, within the vehicle 102x itself, the on-board node 120 may manage communications of said data to and from the on-board devices 118, e.g., by using one or more communication networks that are contained within the vehicle 102x. In an embodiment, the on-board node 120 may include one or more computing devices that are communicatively connected to one or more transceivers or modems fixedly connected to the vehicle 102x, and are also communicatively connected to one or more wired and/or wireless communication networks contained within the vehicle 102x. In an embodiment, the on-board node 120 is included in an on-board data distribution system or device such as the data distribution device described in aforementioned co-pending U.S. patent application Ser. No. 13/675,200 entitled "VEHICLE DATA DISTRIBUTION SYSTEM AND METHOD."

In some cases, the on-board node 120 may include a hybrid communications collector 122. In an embodiment, the hybrid communications distributor 104 may comprise a set of computer executable instructions that are stored on a non-transitory, tangible computer-readable storage media (e.g., a memory) and are executable by one or more processors of the on-board node 120. The hybrid communications collector 122 may receive, via one or more of the forward links 108 and respective modem(s), communications that are provided by the hybrid communications distributor 104 whose contents are intended for delivery to a particular on-board device 118. The hybrid communications collector 122 may determine the recipient device 118, and may cause the contents of the received communications to be delivered via one or more on-board networks to the recipient device 118. Additionally, the hybrid communications collector 122 may cause feedback data or information to be transmitted via one or more reverse links 110 and their respective modem(s) for delivery to the hybrid communications distributor 104. The feedback data or information may include, for example, data or information associated with any one or more communications previously received over one or more of the forward links 108, data or information indicative of a state or condition of any one or more of the forward links 108, and/or data or information indicative of a state or condition of any one or more of the reverse links 110.

Turning now to the vehicle data delivery network 106, in an embodiment, at least a portion of the vehicle data delivery network 106 may be disposed in a terrestrial location, e.g., a packet network router, an optical switch, etc. may be located within a climate-controlled structure on the ground. In an embodiment, at least a portion of the vehicle data delivery network 106 may be disposed in a non-terrestrial location, e.g., a routing node may be disposed on a satellite or aircraft. The vehicle data delivery network 106 may include a public network, a private network, or some combination of one or more public networks and one or more private networks. The vehicle data delivery network 106 may include a communications network, a data network, a packet network, or some combination thereof. The vehicle data delivery network 106 may include a hosted network, or may be a peer-to-peer or other type of ad-hoc network. Indeed, the vehicle data delivery network 106 may use any known networking technology or combination(s) thereof for delivering data. For example, the vehicle data delivery network 106 may use any known networking technology or combination(s) thereof for delivering data between the one or more structures 112 and the data center 105 or the hybrid communications distributor 104 at the data center 105. Generally, the vehicle data delivery network 106 may include a plurality of computing devices that are communicatively connected. One or more portions of the vehicle data delivery network 106 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 105 may be communicatively connected to the vehicle data delivery network 106, and may include one or more computing devices in communicative connection so that they collectively appear, to other networks and/or computing devices, as a single logical entity. In an embodiment, the data center 105 includes the hybrid communications distributor 104. The data center 105 may be located at least partially in a terrestrial environment, e.g., in one or more stationary buildings or structures. For example, one or more portions of the data center 105 may be included in a ground distribution network, such as the ground distribution network described in aforementioned co-pending U.S. patent application Ser. No. 13/675,190. In an embodiment, at least a portion of the data center 105 may be located in a non-terrestrial environment, e.g., on an aircraft, satellite, or space station. It is clear, however, that the data center 105 may be located in any suitable environment, whether stationary, mobile, in a vehicle, terrestrial, or non-terrestrial. In an embodiment, multiple data centers 105 may be included in the hybrid communications system 100 for servicing different types of data, different customers, different geographical areas, or any other desired or suitable differentiations.

The data center 105, and in particular, the hybrid communications distributor 104 included in the data center 105, may be communicatively connected via one or more gateways 130 to one or more other networks 132. Generally, a gateway 130 may include one or more computing devices in communicative connection, and may serve as a boundary between the hybrid communications system 100 and one or more other networks 132. In some embodiments, at least some of the computing devices included in the gateway 130 may also be included in the data center 105. The one or more other networks 132 in communicative connection with the gateway 130 may include, for example, the Internet, a PSTN (Public Switched Telephone Network), and/or some other public network. Additionally or alternatively, the one or more other networks 132 may include one or more private networks. The one or more networks 132 may include any number of wired and/or wireless networks. Although FIG. 1 illustrates the data center 105 being connected to one other network 132 via one gateway 130, the techniques and principles described herein equally apply to hybrid communications systems 100 having and/or being in communicative connection with any desired number of other networks 132 via any number of gateways 130. In some embodiments of the system 100, the gateway 130 may be omitted.

In an embodiment, the other network 132 may provide data, e.g., via the gateway 130 or via a direct connection, data that is to be delivered to a particular device 118 that is on-board a vehicle 102x. In an example, the other network 132 is the PSTN communicatively connected to a terrestrial, cellular network to which the device 118 is homed, and the data to be delivered to the device 118 is a text message or a voice mail forwarded by the home system. In another example, the other network 132 is communicatively connected, via a gateway 130, to one or more computing devices that host a website which a user of the device 118 requests access, and information associated with the website (e.g., the web page, objects, and links thereon) is to be delivered to the device 118 for presentation on a user interface of the device 118 in response to the user request. In yet another example, the other network 132 is communicatively connected to a streaming media provider, and a streamed video file is the data is to be delivered to the on-board device 118 for consumption by the device's user at a user interface. Of course, any type of data may be provided to the data center 105 by any other network 132 (via the gateway 130, if necessary) for delivery to an indicated device 118 on-board the vehicle 102x, e.g., text messages, web pages, media content, streaming data, a response to a previous request received at a user interface of the device 118, data that is to be presented at a user interface of the device 118, an application, a configuration, or other software that the user of the device 118 has requested to be downloaded from the other network 132. Additionally, return data or information from the on-board device 118 (e.g., an activation of a user control, a return text message, a request or command, etc.) that is received at the hybrid communications distributor 104 may be delivered (via the gateway 130, if necessary) to the other network 132.

Figure 2:
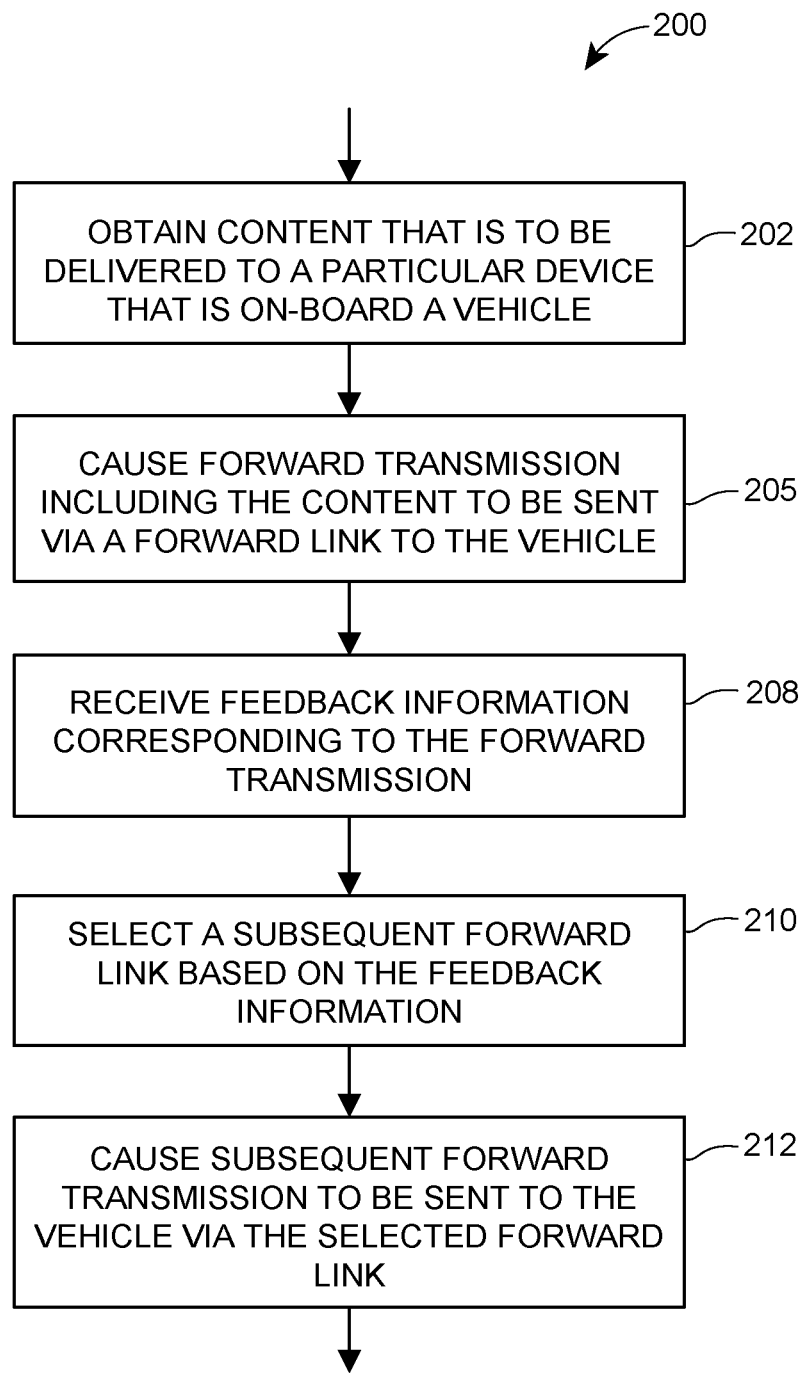
FIG. 2 illustrates an example method of providing hybrid communications to and from devices that are on-board a set of vehicles.

FIG. 2 illustrates an example method 200 for providing communications to and from a device being transported by a vehicle. In an embodiment, the method 200 is performed at least in part by the hybrid communications system 100 of FIG. 1, although some or all of the method 200 may be performed by a communications system other than the system 100. In an embodiment, at least a portion of the method 200 may be performed by the data center 105 or by the hybrid communications distributor 104 of the data center 105. For ease of discussion, the method 200 is described below with simultaneous reference to the system 100 of FIG. 1, however, this is only one of many embodiments and is understood to be non-limiting.

As previously discussed, the recipient device of the data or information included in the communications may be a computing device that is fixedly connected to a vehicle (e.g., a device that is included in an LRU on an aircraft), or the device may be a mobile computing device such as a smart phone, tablet or laptop computing device that is temporarily being transported by the vehicle. In fact, the device may be any device connected to any on-board communication network that is communicatively connected to the on-board node via which data is received onto the vehicle and/or delivered from the vehicle. For ease of discussion, though, and not for limitation purposes, the method 200 is described below in the context of an example scenario in which a device 118 is being transported by a particular vehicle 102x.

At block 202, content that is to be delivered to a particular device 118 being transported by a particular vehicle 102x may be received, e.g., from the network 132, the vehicle data delivery network 106, the data center 105, or from any other suitable source. For example, the data center 105 or the hybrid communications distributor 104 of the data center 105 may receive the content that is to be delivered to the device 118. The received content may include any type of data that may be consumed by a user of the device 118, such as text messages, web pages, media content, streaming data, a response to a previous request received at a user interface of the device 118, and/or data that is to be presented at a user interface of the device 118. In some cases, the received content may be an application, a configuration, other software that the user of the device 118 has requested to be downloaded to the device 118, or other data.

In an embodiment, the content is received in conjunction with an indication that the received content is to be specifically delivered to only the device 118. For example, the received content may be received in one or more packets, messages or other communicated format including a destination address that particularly and singularly indicates or identifies the particular device 118. In some cases, the specific device 118 is the only device being transported by the set of vehicles 102 that is to receive the content. Upon reception of the content and the indication of the device 118, the hybrid communications distributor 104 may determine that the device 118 is currently being transported by (e.g., is on-board) the vehicle 102x.

At block 205, a transmission (e.g., a message, packet, or other suitable communication format) may be caused to be sent, via the vehicle data delivery network 106 and a forward link 108, to the vehicle 102x on which the device 118 is being transported. For example, the hybrid communications distributor 104 may cause the forward transmission to be sent to the vehicle 102x. The forward transmission may include at least a portion of the received content and an indication of the device 118 to which the content included in the forward transmission is to be delivered. The forward link 108 may be supported by a first allocated frequency band, e.g., the forward link 108a of an ATG communications band, or the forward link 108b of a satellite communications band. In an embodiment, the forward link 108 may be included in a frequency band allocated for broadband communications.

In an embodiment, the forward transmission may be sent as a multicast transmission, e.g., a transmission that is sent to a plurality of destinations (including the vehicle 102x) in an essentially parallel manner. The forward transmission may be multicast to multiple vehicles 102 even though the content included therein is to be delivered to only the device 118 and not to other devices on-board the vehicle 102x or on-board other vehicles 102. In an embodiment, the hybrid communications distributor 104 may include the content to be delivered to the device 118 and an indication or identifier of the device 118 in the forward transmission, and the hybrid communications distributor 104 may cause the forward transmission to be multicast over a forward link, e.g., the forward link 108b of the satellite communications band. As such, the multicast transmission may be received by the particular vehicle 102x and by one or more other vehicles 102 that have modems tuned to the frequency band over which the forward transmission is multicast. Each vehicle 102 that receives the multicast transmission may individually determine, e.g., based on the indication of the device 118 included in the multicast transmission, whether or not the device 118 to which the contents carried in the multicast transmission is to be delivered is currently on-board. In an embodiment, multiple contents respectively to be delivered to multiple recipient devices on-board multiple vehicles may be multiplexed into a single forward transmission.

At block 208, feedback information or data corresponding to the forward transmission that was sent to the vehicle 102x over the forward link may be received. In an embodiment, the feedback information is received at the hybrid communications distributor 104 via a reverse link supported by a different allocated frequency band than the frequency band supporting the forward link over which the forward transmission was sent. For example, if, at block 205, the forward link over which the forward transmission is sent is the forward link 108b of the satellite communications link, the reverse link at the block 208 over which the feedback information is received may be the ATG reverse link 110a or the Wi-Fi reverse link 110c. In an embodiment, the feedback information is included in a unicast transmission sent over the reverse link. For instance, the unicast transmission may be transmitted from the vehicle 102x via a selected return link 110. The feedback information may then be delivered to the hybrid communications distributor 104, e.g., via the vehicle data delivery network 106 using the unicast transmission format or another format.

The feedback information may include information or data corresponding to the forward transmission (block 202), in an embodiment. For instance, the feedback information may include signaling information corresponding to the forward transmission received at the vehicle 102x over the forward link, e.g., the feedback information may include reverse signaling such as an acknowledgement of a reception of the forward transmission, or an indication that an expected content was not received in the forward transmission. Accordingly, the forward link of one frequency band may serve as a forward data or payload delivery link, and the reverse link of another frequency band may serve as a signaling link corresponding to the forward data or payload delivery link. Such use of forward and reverse links in different frequency bands may allow efficient use of available communication spectrum while adhering to certain hardware/software constraints or regulatory requirements, in some cases.

For example, multiple forward data that is respectively delivered to various devices on board the vehicle 102x or the vehicles 102 may be multiplexed into a single forward transmission over a broadband forward link (e.g., the forward satellite communications link 108b). In an embodiment, multiplexed forward transmissions may be multicast to a plurality of vehicles 102. Reverse signaling corresponding to the forward transmissions may be transmitted from the vehicle 102x (or the vehicles 102) over a lower-bandwidth reverse link (e.g., via the reverse ATG link 110a or the reverse Wi-Fi link 110c) rather than over the corresponding higher bandwidth reverse link (e.g., reverse signaling is not transmitted over the reverse satellite communications link 110b in this example). In some cases, forward signaling corresponding to the payload may be transmitted from the hybrid communications distributor 104 over the lower-bandwidth link (e.g., the forward ATG link 108a or the forward Wi-Fi link 108c).

In some embodiments, the feedback information may include information corresponding to the availability, bandwidth, and/or quality of transmission of the forward link over which the forward transmission was received. For example, the on-board data distribution node 120 may determine the quality of the forward link over which the forward transmission was received based on characteristics of the received forward transmission, such as error correction, delay, and/or whether the contents were expected or not expected. In some cases, the on-board data distribution node 120 may determine the quality of the forward link (and/or the availability or bandwidth of the forward link, for that matter) via other data, such as the strength of signals received over the forward link, information detected by a link monitor, and the like. In a similar manner, the on-board data distribution node 120 may determine the availability, bandwidth, and/or quality of transmission of other forward links 108 and/or of any or all of the reverse links 110.

At block 210, a forward link over which a subsequent transmission is to be delivered to the vehicle 102x (e.g., a "subsequent forward link") may be selected based on the received feedback information. In an embodiment, after the hybrid communications distributor 104 has received the feedback information (block 208), the hybrid communications distributor 104 may select, based on the received feedback information, a subsequent forward link to use for delivery of a subsequent transmission to the vehicle 102x. For example, if the feedback information indicates that a quality of transmission or a bandwidth of one of the forward links has fallen below a threshold, that particular forward link may be removed from the selection pool of forward links, at least until the hybrid communications distributor 104 receives an indication that the quality or bandwidth of the particular forward link has returned to an acceptable level.

In an embodiment, the subsequent forward link may be selected additionally or alternatively based on a type of content that is included in the subsequent forward transmission. For example, a first forward transmission may include a text message that is to be delivered to the device 118, whereas a subsequent forward transmission may include streaming media content that is to be delivered to another device on-board the vehicle 102x. In this example, the hybrid communications distributor 104 may select an ATG forward link 108a to deliver the text message (e.g., if the ATG forward link 108a currently has sufficient spare bandwidth to support the relatively small text message), and the hybrid communications distributor 104 may select the satellite forward link 108b to deliver streaming media content, as the satellite forward link 108b may be a broadband connection link having a greater bandwidth or speed than that of the ATG forward link 108a, which may better support the relatively larger media content. For example, the bandwidth or speed of the satellite forward link 108b may be two times greater than that of the ATG forward link 108a, three times greater, four times greater, five times greater, six times greater, seven times greater, or greater by a factor larger than seven. In some cases, the hybrid communications distributor 104 may select a forward link based on a latency that may be tolerated for the particular content of the subsequent forward transmission. For example, a non-real time media stream such as a video may be buffered for later or delayed delivery to a recipient device.

At block 212, the subsequent forward transmission is caused to be sent to the vehicle 102x using the selected forward link. For example, the subsequent forward transmission may be caused to be sent to the vehicle 102x in a manner such as previously discussed with respect to the block 205.

Any or all of the method 200 may be executed while the vehicle 102x is any state that indicates a dynamic movement of the vehicle 102x, or that indicates that the vehicle 102x is en route or between an origination and a destination. For example, the vehicle 102x may be an aircraft, and at least a portion of the method 200 may be executed while the vehicle 102x is in any one of a plurality of flight states, e.g., in-flight, climbing, descending, weight-on-wheels, or any one of a plurality of possible port states.

With regard to "port states," generally, as used herein, a "port" may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, aircraft carriers, and the like. As such, a "port state" of a vehicle, as used herein, generally refers to a vehicle state indicating that the vehicle is in the vicinity of (or proximate to) a vehicle port, e.g., the vehicle is taking-off, landing, taxiing, parked, docked, in the harbor, in the freight yard, etc. A port state may indicate that the vehicle is stationary or is not stationary. A port state may be determined, for example, by determining that the vehicle is within a certain distance of a port, e.g., by using a geo-spatial location of the vehicle (e.g., as determined by a Global Positioning System or GPS), and/or by detecting the presence and/or a signal strength of a beacon signal that is transmitted by a transceiver of the port. Of course, vehicles that are not aircraft may nonetheless have the ability to be in a port state, e.g., when a boat is within a harbor or docked at a port, when a truck is at a gas station or weigh station, or any time when a vehicle is not traveling en route between ports.

In an embodiment, the entirety of the method 200 is executed while the vehicle 102x is in a port state. In an embodiment, the entirety of method 200 is executed while the vehicle 102x is in a dynamic movement state (e.g., in-flight, sailing, or moving along a highway). In an embodiment, the entirety of the method 200 is executed while the vehicle 102x is in a stationary state (e.g., parked at a gate, stopped at a rest stop, or halted on a taxi-way).

Figure 3:
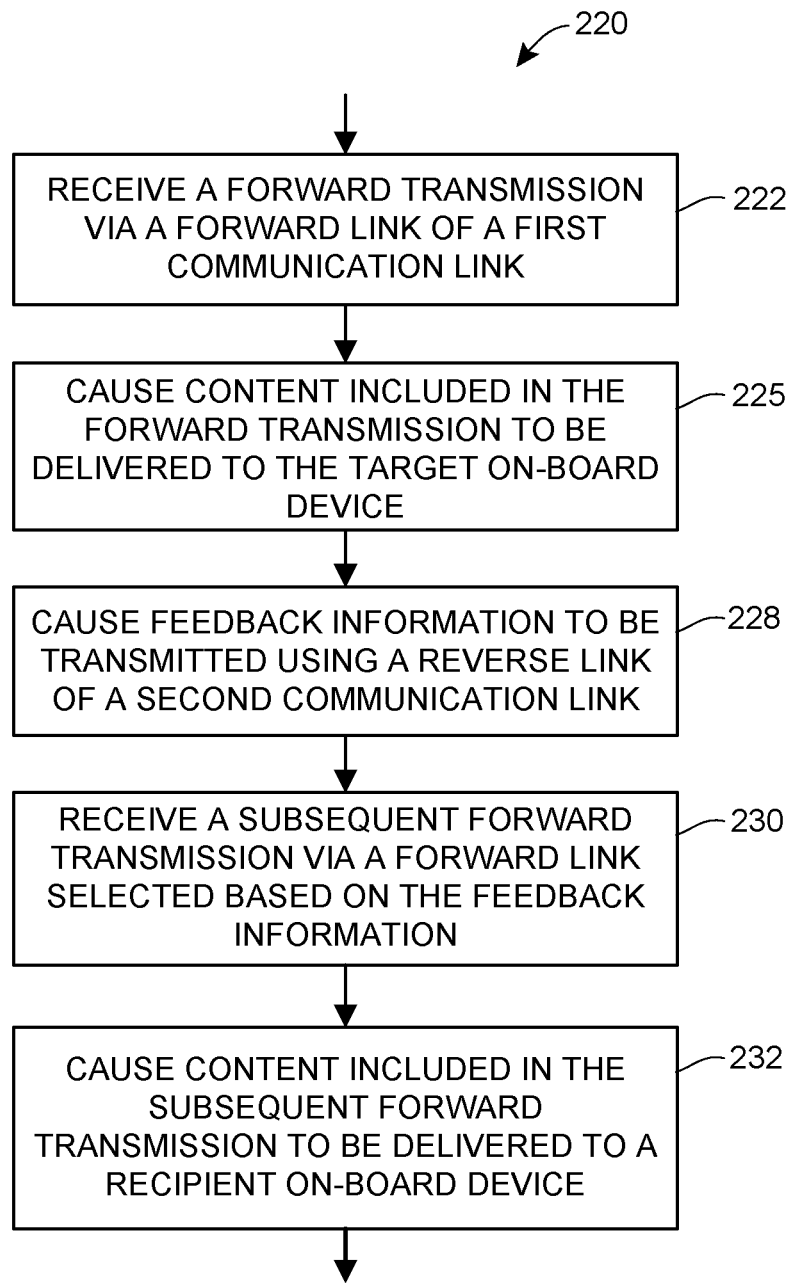
FIG. 3 illustrates an example method of providing hybrid communications to and from devices that are on-board a set of vehicles.

FIG. 3 illustrates an example method 220 for providing communications to and from a device being transported by a vehicle. In an embodiment, the method 220 is performed at least in part by the hybrid communications system 100 of FIG. 1, although some or all of the method 220 may be performed by a communications system other than the system 100. In an embodiment, at least a portion of the method 220 is performed by the hybrid communications collector 122 included in the on-board node 120. In an embodiment, the method 220 may operate in conjunction with a least a part of the method 200 of FIG. 2. For ease of discussion, the method 220 is described below with simultaneous reference to the system 100 of FIG. 1 and the method 200 of FIG. 2, however, this description is only one of many embodiments and is understood to be non-limiting.

As previously discussed, the recipient device of the information or data included in communications received at the vehicle may be any device that is communicatively connected with any on-board communication network that, in turn, is communicatively connected to the on-board node via which the communications are received onto the vehicle. For ease of discussion only and not for limitation purposes, the method 220 is described below in the context of an example scenario in which the device 118 is a mobile computing device being transported by a particular vehicle 102x.

At block 222, a forward transmission including content that is to be delivered to the mobile device 118 on-board the vehicle 102x is received at the vehicle 102x. For example, the hybrid communications collector 122 of the on-board node 120 may receive a forward transmission including content that is to be delivered to the device 118. In an embodiment, the content is to be delivered only to the device 118, and not to any other device on-board the vehicle 102x. The content may include data that is to be presented at a user interface of the device 118, data that is to be stored at or executed by the device 118, or any other data that is to be utilized by the device 118 or by a user of the device 118, such as previously discussed.

The forward transmission may be received (block 222) over one of a plurality of forward links to the vehicle 102x and its respective modem that is fixedly connected to the vehicle 102x. The forward link over which the forward transmission is received may be supported by a first allocated frequency band, e.g., the forward link 108b of the satellite communications band.

In an embodiment, the forward transmission may be received at the vehicle 102x (block 222) as a multicast transmission. The multicast transmission may include the content to be delivered to the device 118 and an indication or identifier of the target or recipient device 118. In an embodiment, the content and the indication of the target device 118 may be multiplexed, in the multicast transmission, with other content that is intended to be delivered to the target device 118 or to other target devices on-board any of the vehicles 102. At the particular vehicle 102x, the hybrid communications collector 122 may recover the content and the indication of the content's target device 118 after de-multiplexing the multicast transmission, or after using some other suitable technique to extract the desired information from the forward transmission.

Based on the indication of the device 118 included in the forward transmission, the hybrid communications collector 122 may determine whether or not the device 118 to which the content is to be delivered is currently on-board the vehicle 102x. If the device to which the content is to be delivered is determined to be not on-board the vehicle 102x, no further processing on the received forward transmission may be performed. If the device to which the content is to be delivered is determined to be on-board the vehicle 102x, e.g., the device 118, the method 220 may include causing the content of the received transmission to be sent to the recipient or target device 118 via one or more communication networks contained within the vehicle 102x (block 225). For example, if the device 118 is a mobile computing device connected to a Wi-Fi network on-board the vehicle 102x, the hybrid communications collector 122 may include the content in an IEEE 802.11 compatible transmission, and may cause the transmission to be delivered over the on-board Wi-Fi network to the device 118. Other examples of on-board data delivery other than Wi-Fi, though, are additionally or alternatively possible. Indeed, the method 220 may use any means and/or techniques of delivering, within the vehicle 102x, the received content to an on-board device, such as any of the means and/or techniques described in the aforementioned co-pending U.S. patent application Ser. No. 13/675,200.

At block 228, feedback information may be caused to be transmitted from the vehicle 102x. In an embodiment, the feedback information may be transmitted from the vehicle 102x using a reverse link that is supported by a different allocated frequency band than the frequency band supporting the forward link over which the forward transmission was received (block 222). For example, if the forward link (block 222) is the forward link 108b of the satellite communications link, the reverse link over which the feedback information is transmitted (block 228) may be the ATG reverse link 110a or the Wi-Fi reverse link 110c. In an embodiment, the feedback information is included in a unicast transmission sent over the reverse link. For instance, the hybrid communications collector 122 may cause the unicast transmission may be transmitted from the vehicle 102x via the selected return link 110.

As previously discussed with respect to FIG. 2, the feedback information may include information or data corresponding to the received forward transmission (block 222) or to other received forward transmissions, information or data corresponding to the forward link over which the forward transmission (block 222) was delivered to the vehicle 102x, information or data corresponding to other forward links, and/or information or data corresponding to one or more reverse links. For example, the feedback information may include reverse signaling information corresponding to the forward transmission received at the vehicle 102x over the forward link (block 222), e.g., the feedback information may include an acknowledgement of a reception of the forward transmission, or that an expected content was not received in the forward transmission. As such, in this example, the vehicle 102x may utilize the forward link of one frequency band as a forward data or payload delivery link, and may utilize the reverse link of another frequency band as a signaling link corresponding to the forward data or payload delivery link.

In an embodiment, the vehicle 102x may utilize the forward link (e.g., the forward link of block 222) as a unidirectional communication link. For example, the vehicle 102x may cause the transceiver or the modem that is connected to the communications link including the forward link to operate in a receive-only mode. The vehicle 102x may utilize the second communication link as a reverse link corresponding to the unidirectional forward link (e.g., the reverse link of block 228). The vehicle 102x may utilize the second communication link as a unidirectional link (e.g., by placing the transceiver or modem connected to the second communication link in a transmit-only mode), or the vehicle 102x may utilize the second communication link as a bi-directional link (e.g., by allowing the transceiver or modem connected to the second communication link to be used in both receive and transmit modes).

It is noted that the vehicle 102x may utilize numerous different configurations and numbers of first and second communication links to realize the hybrid communication techniques discussed herein, e.g., techniques in which communications are delivered to and from devices on-board a vehicle using forward and reverse links of different communications frequency bands. For example, at least some of the techniques described herein may be realized by using one or more full duplex (e.g., bi-directional) communication links as a logical forward link, and by using one or more other full duplex communication links supported by one or more frequency bands different than the frequency band(s) of the logical forward link as a corresponding logical reverse link. In another example, at least some of the techniques described herein may be realized using one or more unidirectional communication links as the logical forward link, and using one or more other uni-directional communication links supported by one or more frequency bands different than the frequency band(s) of the logical forward link as a corresponding logical reverse link. In yet another example, one or more full-duplex communications links may be used as the logical forward link, and one or more uni-directional communications links supported by one or more frequency bands different than the frequency band(s) of the logical forward link are used as a corresponding logical reverse link. In still another example, one or more uni-directional communications links may be used as the logical forward link, and one or more full-duplex communications links supported by one or more frequency bands different than the frequency band(s) of the logical forward link are used a corresponding logical reverse link.

At block 230, a subsequent forward transmission may be received at the vehicle 102x. The subsequent forward transmission may include additional content that is to be delivered to the device 118, or the subsequent forward transmission may include content that is to be delivered to other devices on-board the vehicle 102x or on-board other vehicles 102. The subsequent forward transmission may be received over one of a plurality of forward links to the vehicle 102x, and the forward link over which the subsequent forward transmission is received may have been selected based on the feedback information previously transmitted from the vehicle 102x (block 228), and/or may have been selected based on a type of the additional content. As such, the forward link of block 230 may be the same forward link of block 222, or may be a different forward link.

The hybrid communications collector 122 may determine whether or not the device to which the content of the subsequent forward transmission is to be delivered is currently on-board the vehicle 102x, e.g., in a similar manner as discussed above with respect to block 225. If the device to which the content is to be delivered is determined to be not on-board the vehicle 102x, no further processing on the subsequent transmission may be performed. If the device to which the content is to be delivered is on-board the vehicle 102x, e.g., the device 118, the method 220 may include causing the content of the received subsequent transmission to be sent to the recipient or target device 118 via one or more communication networks contained within the vehicle 102x (block 232), e.g., in a manner similar to that discussed above with respect to the block 225.

In an embodiment, after the block 232, the method 220 may include causing subsequent feedback information to be sent from the vehicle 102x (not shown). The subsequent feedback information may include data or information corresponding to the subsequent forward transmission, to the forward link over which the subsequent forward transmission was delivered to the vehicle 102x, to other forward links, and/or to one or more reverse links. For example, the hybrid communications collector 122 may cause the subsequent feedback information to be transmitted from the vehicle 102x using a selected reverse link for delivery to the hybrid communications distributor 104 in a manner similar to that discussed with respect to block 228. The hybrid communications distributor 104 may then utilize the subsequent feedback information to select a next forward link, in an embodiment.

Similar to the method 200, any or all portions of the method 220 may be executed while the vehicle 102x is any state that indicates a dynamic movement of the vehicle 102x, such as a flight state or a state indicating that the vehicle 102x is traveling between ports. Any or all of the method 220 may be executed while the vehicle 102x is any port state. Any or all of the method 220 may be executed while the vehicle 102x is in stationary state (e.g., parked at the gate, docked at a port, or halted on a taxi-way).

Figure 4:
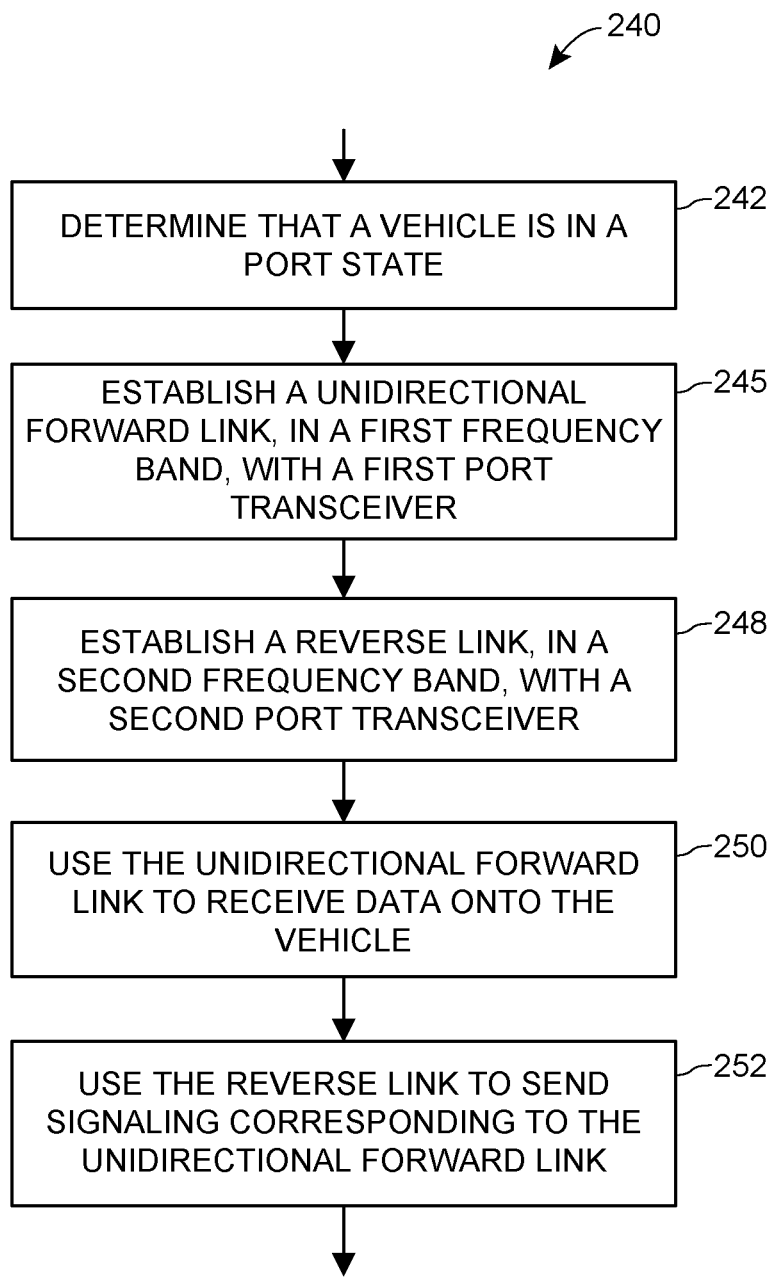
FIG. 4 depicts an example method to optimize modem or transceiver usage on a vehicle.

In an embodiment, one or more of the techniques described above for delivering communications to a device being transported by a vehicle may be adapted to efficiently use modems or transceivers at the vehicle, e.g., to minimize the usage of one or more modems/transceivers of the vehicle. FIG. 4 illustrates an example method 240 for effective modem or transceiver usage on a vehicle. In an embodiment, the method 240 is performed at least in part by the hybrid communications system 100 of FIG. 1, although some or all of the method 240 may be performed by a communications system other than the system 100. In an embodiment, at least a portion of the method 240 is performed at the vehicle, such as by the on-board node 120 of the vehicle 102x, or by the hybrid communications collector 122 included in the on-board node 120. In an embodiment, the method 240 may operate in conjunction with at least a part of one or both methods described in FIGS. 2-3. For ease of discussion, the method 240 is described below with simultaneous reference to FIGS. 1-3, however, this description is only one of many embodiments and is understood to be non-limiting. Additionally, for ease of discussion only and not for limitation purposes, the method 240 is described in the context of an example scenario in which modem or transceiver usage is optimized at a particular vehicle 102x.

In the United States and other jurisdictions, when the vehicle 102x is in a port state (e.g., is located proximate to or near a port), the vehicle 102x is required to comply with restrictions issued by the government, the port, and other regulatory authorities as to which transceivers or modems on-board the vehicle 102x are allowed to transmit. For example, transceivers or modems of an aircraft are not allowed to transmit over a satellite frequency band while the aircraft is parked at the gate or is taxiing at an airport. Accordingly, to comply with regulations, the vehicle 102x may disable the transmit functionality of a modem or transceiver tuned to a satellite frequency band while the aircraft is parked at the gate or near a port.

However, typically no restrictions are placed on whether or not a modem or transceiver of a vehicle 102x is allowed to receive while the vehicle 102x is at or near a port. Accordingly, while the vehicle 102x is parked at the gate, is taxiing, or is in some other port state, the vehicle 102x may utilize the forward band of a high-bandwidth frequency band (such as a satellite communications frequency band or other frequency band allocated for broadband communications) to receive data onto the vehicle 102x. As such, the vehicle 102x may receive data using a high-speed, unidirectional forward link in one frequency band, and may use another communications link in a different frequency band as a corresponding reverse link. For example, while the vehicle 102x is in a port state, the forward link 108b of a higher-speed satellite communications link may be utilized for high-speed data delivery to the vehicle 102x, and the lower-speed ATG reverse link 110a or the Wi-Fi reverse link 110c may be utilized as a reverse link corresponding to the forward link 108b. The lower-speed reverse link may be utilized by the vehicle 102x as a unidirectional reverse link (e.g., the vehicle 102x may cause the modem or transceiver connected to the lower-speed reverse link to operate in a transmit-only mode), or the lower-speed reverse link may be utilized by the vehicle as a bi-directional link (e.g., the vehicle 102x may cause the modem or transceiver connected to the lower-speed reverse link to operate in a transmit and receive mode). In an embodiment, the bandwidth or speed of the high-speed forward link may be two times greater than that of the reverse link, three times greater, four times greater, five times greater, six times greater, seven times greater, or greater by a factor larger than seven.

Thus, while the vehicle 102x is in a port state, the use of a high-speed, unidirectional forward link over which to load data onto the vehicle 102x and the corresponding use of a lower-speed reverse link takes advantage of the varying capabilities of different communication links to shorten the time needed to deliver electronic data onto the vehicle 102x at a vehicle port, while at the same time fully complying with transmit regulations. As such, usage of the different types of modems or transceivers on the vehicle 102x is optimized so that data delivery times are shortened, and the vehicle 102x may be more quickly readied for a subsequent travel leg.

In view of the above, the method 240 may determine that a vehicle 102x is in a port state (block 242). In an embodiment, the on-board node 120 of the vehicle 102x or the hybrid communications collector 122 included in the on-board node 120 may determine that the vehicle 102x is in one of a plurality of port states, for example, by receiving information from a GPS receiver, a sensor, or some other computing device on-board the vehicle 102x that is configured to monitor and determine the transportation state of the vehicle 102x.

At block 245, a first communication link for delivering data onto the vehicle 102x may be established, e.g., at a first modem that is fixedly connected to the vehicle 102x and that is tuned to a first frequency band. In an embodiment, the first communication link is a first wireless communication link. For example, after the vehicle 102x is determined to be in a port state (block 242), the on-board node 120 or the hybrid communications collector 122 may ensure that the first modem is in a receive-only state, and may use the first modem to establish a unidirectional, forward communication link 108, over the first frequency band, with a port transceiver or modem that is provided at the port and is external to the vehicle 102x. In an embodiment, the unidirectional forward link 108 supports a broadband protocol, such as a satellite communication protocol or other broadband protocol. Additionally, the port transceiver or modem at the port end of the unidirectional forward link 108 may be in communicative connection with the data center 105 or with the hybrid communications distributor 104 at the data center 105, e.g., via the vehicle data delivery network 106. As such, the wireless, unidirectional forward communication link 108 may support at least a portion of a logical forward link from the data center 105 (or the hybrid communications distributor 104 at the data center 105) to the vehicle 102x, the on-board node 120, the hybrid communications collector 122, a recipient device that is on-board the vehicle, e.g., the device 118, or a vehicle travel application (VTA) installed on the device 118 and particularly configured to support services while the device 118 is being transported by the vehicle 102x. In embodiment, the logical forward data link may be a forward link of a data tunnel. (Data tunnels are more fully described with respect to FIG. 6.)

At block 248, a second communication link may be established at a second modem that is fixedly connected to the vehicle 102x and is tuned to a second frequency band different from the first frequency band. In an embodiment, the second communication link may a second wireless communication link. The second communication link may be a unidirectional (transmit-only) reverse link, or the second communication link may be a bi-directional link that includes a reverse link. For example, after the vehicle 102x is determined to be in a port state (block 242), the on-board node 120 or the hybrid communications collector 122 may use the second modem to establish the second communication link, over the second frequency band, with another port transceiver or modem that is provided at the port and external to the vehicle 102x. In an embodiment, the second port transceiver or modem is in communicative connection with the data center 105 or with the hybrid communications distributor 104 at the data center, e.g., via the vehicle data delivery network 106. As such, the reverse communication link 110 may support at least a portion of a logical reverse link from the vehicle 102x, the on-board node 120, the hybrid communications collector 122, the device 118, or the VTA on the device 118 to the data center 105 or the hybrid communications distributor 104 at the data center 105. In an embodiment, the logical reverse data link may be a reverse link of the data tunnel in which the logical forward data tunnel link is included.

At block 250, the method 240 may include using the first communication link as a forward link over which data is able to be received onto the vehicle 102x while the vehicle 102x is in a port state. The data may include content that is to be delivered to a device that is on-board the vehicle. The device to which the content is to be delivered may be an on-board data storage device that is fixedly connected to the vehicle 102x, in an embodiment. In one scenario, the received data may include entertainment media content that is to be delivered for storage at an on-board entertainment storage database or data device, and in another scenario, the received data may include updated maps or charts that are to be delivered to a navigation system on-board the vehicle 102x. In an embodiment, the data received onto the vehicle 102x via the unidirectional forward link may include multiplexed content data that is to be respectively delivered to multiple devices on-board the vehicle 102x. In this embodiment, the on-board node 120 or the hybrid communications collector 122 of the on-board node 120 may de-multiplex the received, multiplexed transmission. In an embodiment, the received data may include content that is to be delivered to only the specific mobile computing device. In an embodiment, the received content may have been delivered, by the vehicle data delivery system 106 or other network, to a destination port of the vehicle 102x while the vehicle 102x was en route to the destination port, e.g., by using one or more of the techniques described in aforementioned co-pending U.S. patent application Ser. No. 13/675,190 entitled "GROUND SYSTEM FOR VEHICLE DATA DISTRIBUTION."

In some cases, the data may be received onto the vehicle 102x over the unidirectional communication link in a multicast transmission. For example, a service provider may desire to update the on-board entertainment offerings at all of a fleet of vehicles when the vehicles arrive at a particular port. The service provider may use a multicast transmission on a high-bandwidth forward link to deliver the updated on-board entertainment content to all vehicles of the fleet that are parked at the port. In another example, a critical software update may be required to be delivered to a particular LRU on-board the vehicle. The software update may be multicast, using a high-speed forward link, to all vehicles that are parked at the port and that include the particular LRU. In an embodiment, the multicast transmission received at the vehicle 102x over the unidirectional communication link may include an indication of the recipient device, and the on-board node 120 or the hybrid communications collector 122 may determine whether or not the recipient device is on-board the vehicle 102x. If the recipient device is not on-board the vehicle 102x, the multicast transmission may be dropped or otherwise ignored.

When the recipient device is determined to be on-board the vehicle 102x, the method 240 may include causing the data that was received via the first, unidirectional communication link to be delivered to the recipient device, e.g., via one or more communication networks contained within the vehicle 102x, in an embodiment. For example, the method 240 may utilize any of the on-board data delivery techniques described in aforementioned co-pending U.S. patent application Ser. No. 13/675,200.

At block 252, the method 250 may include using the second communication link as a reverse link, corresponding to the forward link, over which feedback or second data is able to be transmitted from the vehicle 102x while the vehicle 102x is in one of the plurality of port states. For example, an acknowledgement of a receipt of the received data may be signaled via the reverse link, or any other suitable reverse signaling corresponding to the received data (block 250) may be transmitted via the reverse link (block 252). In an embodiment, the bandwidth or speed of the first communication link may be two times greater than that of the second communication link, three times greater, four times greater, five times greater, six times greater, seven times greater, or greater by a factor larger than seven.

Figure 5:
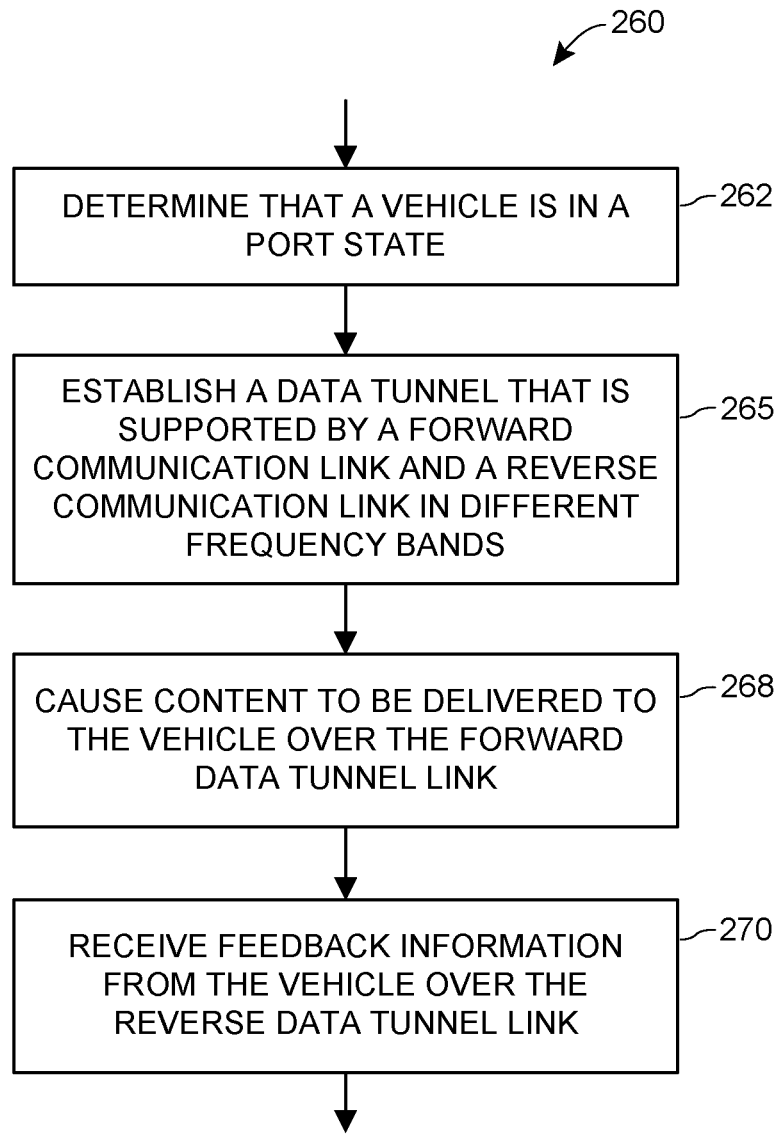
FIG. 5 depicts an example method for using a hybrid communications system to effectively use a modem or transceiver on a vehicle.

FIG. 5 illustrates an example method 260 for optimizing modem or transceiver usage on a vehicle. In an embodiment, the method 260 is performed at least in part by the hybrid communications system 100 of FIG. 1, although some or all of the method 260 may be performed by a communications system other than the system 100. In an embodiment, at least a portion of the method 240 is performed by the data center 105 or by the hybrid communications distributor 104 included in the data center 105. In an embodiment, the method 260 may operate in conjunction with a least a part of one or more of the methods described in FIGS. 2-4. For ease of discussion, the method 260 is described below with simultaneous reference to FIGS. 1-4, however, this description is only one of many embodiments and is understood to be non-limiting. Additionally, for ease of discussion only and not for limitation purposes, the method 260 is described below in the context of an example scenario in which modem or transceiver usage is optimized at a particular vehicle 102x of a plurality of vehicles 102.

At block 262, a determination that a vehicle 102x is in one of a plurality of port states may be made. For example, the data center 105 or the hybrid communications distributor 104 at the data center 105 may determine that the vehicle is in a port state by receiving an indication of the vehicle's state from another computing device, sensor, or data source.

At block 265, a data communication tunnel may be established between the data center 105 and the vehicle 102x. For example, a data communication tunnel may include a first end that is not on-board the vehicle 102x, which may be the data center 105 or the hybrid communications distributor 104 at the data center. The data communication tunnel may include a second end that is on-board the vehicle 102x. The end of the data communication tunnel on-board the vehicle 102x may be, for example, the on-board node 120 of the vehicle 102*x*, the hybrid communications collector 122, the device 118, or the VTA executing on the device 118.

Figure 6:
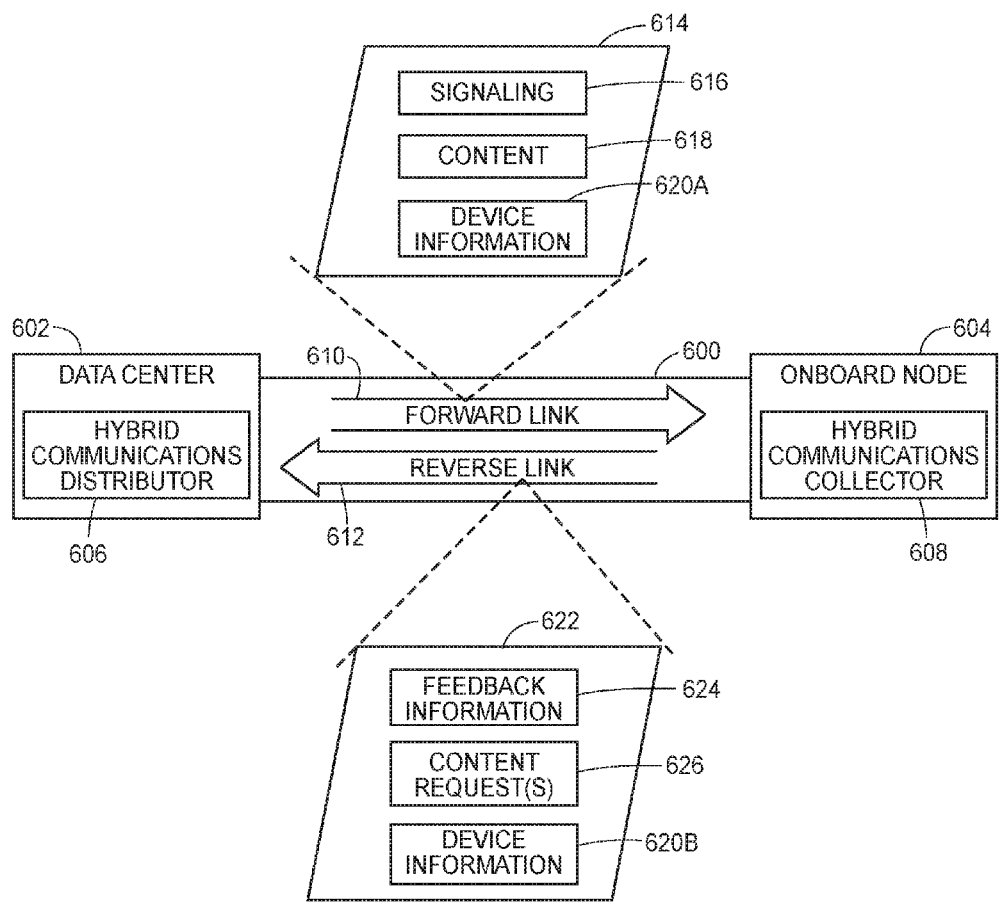
FIG. 6 includes an example block diagram of a data communication tunnel established in a hybrid communications system.

A block diagram of an example data communication tunnel 600 that may be established by the method 260 or that may otherwise be established in the hybrid communications system 100 or in another hybrid communications system is provided in FIG. 6. As used herein, the terms "data communication tunnel," "data tunnel," and "tunnel" are used interchangeably to refer to an encapsulated transmission path or logical connection, e.g., between a node or data center 602 that is external to the vehicle 102*x*, and a node 604 that is on-board the vehicle 102*x*. In some cases, the data communication tunnel 600 may be an encapsulated transmission path or logical connection having a first endpoint that is external to the vehicle 102*x*. For example, the first endpoint of the data tunnel may be the data center 602 or may be a hybrid communications distributor 606 at the data center 602. In an embodiment, the hybrid communications distributor 606 may be the hybrid communications distributor 104 of FIG. 1.

The data communication tunnel 600 may have a second endpoint that is disposed on-board the vehicle 102*x*. For example, the second endpoint of the data tunnel 600 may be the on-board node 604, or may be an application 608 executing on the on-board node 604, such as the hybrid communications collector 122 executing on the on-board node 120. In some cases, the second endpoint of the data tunnel 600 may be the recipient device 118, or may be the VTA or some other application executing on the recipient device 118.

The data tunnel 600 may be realized, in an embodiment, by utilizing a tunneling protocol between the two endpoints. The packets or transmissions of the tunneling protocol may be encapsulated within packets or transmissions of other procotol(s) used by communication link(s) supporting the tunnel 600. As an example, referring simultaneously to FIGS. 1 and 6, an example data tunnel between the hybrid communications distributor 104 and the device 118 on-board the vehicle 102*x* may include a data tunnel forward link 610 that uses a data tunnel protocol. Forward packets of the data tunnel protocol may be encapsulated by each of the respective protocols used by the various forward links supporting the data tunnel forward link 610, e.g., respective protocols used by the vehicle data delivery network 106, a selected forward link 108, and the Wi-Fi forward link within the cabin of the vehicle 102*x*. Similarly, a data tunnel reverse link 612 between the hybrid communications distributor 104 and the device 118 may be supported by a Wi-Fi reverse link within the cabin of the vehicle 102*x*, a selected reverse link 110, and the vehicle data delivery network 106, e.g., each of the respective protocols utilized on these various supporting reverse links encapsulates the data tunnel protocol packets in the reverse direction.

In embodiments where the data tunnel 600 is included in the hybrid communications system 100, the data tunnel forward link 610 may be supported by one or more communication links that differ in protocol and/or frequency band from the one or more communication links supporting the data tunnel reverse link 612. Further, the data tunnel forward link 610 and the data tunnel reverse link 612 may differ in their respective supporting message delivery schemes (e.g., multicast or unicast), and/or in the number of supporting communication links used (e.g., multiple supporting communication links in the data tunnel forward link 610 and one supporting communication link in the data tunnel reverse link 612). Nonetheless, the data tunnel 600 between the data center 602 and on-board node 604 may be, in some cases, logically represented (e.g., in a software application) as having one logical data tunnel forward link 610 or forward stream of data, and one logical data tunnel reverse link 612 or reverse stream of data, in an embodiment.

Forward data 614, or data sent on the data tunnel forward link 610 to the on-board node 604, may include, for example: (i) content 618 for delivery to one or more on-board recipient devices that are in communicative connection to the on-board node 604, where the content 618 may include any type of data, such as text messages, web pages, media content, streaming data, a response to a previous request received at a user interface of an on-board device, data that is to be presented at a user interface of an on-board device, an application, a configuration, other software that the user of an on-board device has requested to be downloaded, etc.; (ii) signaling information 616 corresponding to the content 618 and to the delivery of the content 618 over the data tunnel 600; (iii) device information 620*a* identifying the on-board recipient device or devices to which the content 618 is to be delivered; and/or (iv) other forward signaling information 616 corresponding to usage of the data tunnel 600 itself (e.g., availability, quality of transmission, bandwidth management, etc.).

Reverse data 622, or data sent on the data tunnel reverse link 612 to the data center 602, may include, for example: (i) feedback information 624 corresponding to the delivered content 618 and/or corresponding to the usage of data tunnel 600 (e.g., availability, quality of transmission, bandwidth management, etc.); (ii) content requests 626 from on-board devices, where the content requests 626 are generated by a user of an on-board device or by the on-board device itself; and/or (iii) device information 620*b* identifying the on-board devices generating the content requests 626.

Although several specific examples of forward data 614 and reverse data 622 are discussed above, it is understood that the data tunnel forward link 610 and the data tunnel reverse link 612 may carry any desired type of data between the endpoints of the tunnel 600. Additionally, it is clear that the forward data 614 may be split, aggregated, multiplexed, or combined into any number of data structures, packets, or messages, e.g., for the sake of efficiency and timeliness. Similarly, the reverse data 622 may additionally or alternatively be split, aggregated, multiplexed, or combined into any number of data structures, packets, or messages. Furthermore, in an embodiment, multiple data tunnels may be established between the two endpoints. For example, the data center 602 or the hybrid communications distributor 606 included therein may establish multiple data communication tunnels with the node 604 on the particular vehicle 102*x*, and/or may establish multiple data communication tunnels with multiple nodes on multiple vehicles 102.

Returning now to the block 265 of the method 260, the established data communication tunnel may include a data tunnel forward link and a data tunnel reverse link, e.g., the forward link 610 and the reverse link 612 described with respect to FIG. 6. The data tunnel forward link 610 may be supported by a forward communication link 108 connected to first modem that is fixedly connected to the vehicle 102*x* and operated in a receive-only mode. As such, the data tunnel forward link 610 may be supported by a unidirectional forward communication link 108. The data tunnel reverse link 612 may be supported by a reverse communication link 110 connected to a second modem that is fixedly connected to the vehicle 102*x*. The second modem may be operated in a transmit-only mode, or may be operated in both transmit and receive modes. The first and the second modems may be tuned to different frequency bands so that the forward link 108 (supporting the data tunnel forward link 610) and the reverse link 110 (supporting the data tunnel reverse link 612) are themselves supported by different frequency bands and protocols.

When the vehicle is determined to be in a port state (block 262), forward data may be caused to be delivered from the endpoint of the data tunnel that is external to the vehicle 102x to the endpoint of the data tunnel that is on-board the vehicle 102x (block 268). For example, forward data may be caused to be delivered from the data center 105 or the hybrid communications distributor 104 to one of the on-board node 120, the hybrid communications collector 122, the target on-board device, or an application executing on the target on-board device. The delivered forward data may include, for example, any or all types of forward data 614.

When the vehicle is determined to be in a port state (block 262), reverse feedback information or data may be caused to be delivered from the endpoint of the data tunnel that is on-board the vehicle 102x to the endpoint of the data tunnel that is external to the vehicle 102x (block 268). For example, reverse data may be caused to be delivered from one of the on-board node 120, the hybrid communications collector 122, the target on-board device 118, or an application executing on the target on-board device (e.g., the VTA) to the data center 105 or to the hybrid communications distributor 104. The delivered reverse data may include, for example, any or all types of reverse data 622.

Figure 7:
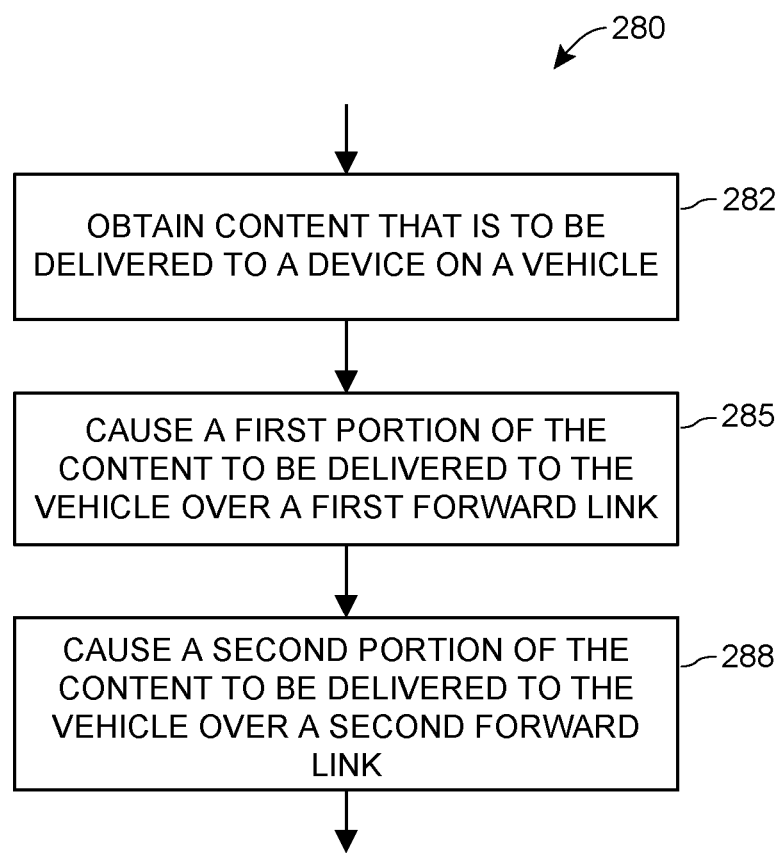
FIG. 7 illustrates an example method for delivering content in a distributed or hybrid manner to devices being transported by vehicles.

FIG. 7 illustrates an example method 280 for delivering content, in a distributed or hybrid manner, to a device that is on-board a vehicle. In an embodiment, the method 280 is performed at least in part by the hybrid communications system 100 of FIG. 1, although some or all of the method 280 may be performed by a communications system other than the system 100. In an embodiment, at least a portion of the method 280 is performed by the data center 105 or by the hybrid communications distributor 104 included in the data center 105. In an embodiment, the method 280 may operate in conjunction with a least a part of one or more of the methods described in FIGS. 2-5, and/or with the data tunnel 600 of FIG. 6. For ease of discussion, the method 280 is described below with simultaneous reference to FIGS. 1-6, however, this description is only one of many embodiments and is understood to be non-limiting. Additionally, for ease of discussion only and not for limitation purposes, the method 280 is described below in the context of an example scenario in which data is to be delivered to a device 118 that is on-board a particular vehicle 102x of a plurality of vehicles 102.

At block 282, content that is to be delivered to a device 118 being transported by a vehicle 102x may be obtained. For example, content that is to be delivered to the device 118 may be obtained by the data center 105 or by the hybrid communications distributor 104 of the data center 105, e.g., by receiving the content from an external network 132, the vehicle data delivery network 106, or other suitable source, or from obtaining the content from the data center 105 itself or from some other data storage entity. The device 118 to which the content is to be delivered may be any device previously discussed with respect to FIGS. 1-6, e.g., a mobile computing device being temporarily transported by the vehicle 102x, or a computing device that is fixedly connected to the vehicle 102x. Similarly, the content to be delivered to the device 118 may be any type of content previously discussed with respect to FIGS. 1-6, e.g., a web page, streaming data, a text message, a response to a previous request, etc. With respect to the method 280, though, the content to be delivered to the device 118 is to be delivered to the device 118 as a whole, e.g., an entire web page, a streaming video or movie, etc. In embodiment, the obtained content is to be delivered to the device 118 as a whole to be presented, as a whole, at a user interface of the device 118.

At block 285, a first portion of the obtained data may be included in a first transmission, and the first transmission may be caused to be sent via a first forward link to the vehicle 102x. At block 288, a second portion of the obtained data may be included in the second transmission, and the second transmission may be caused to be sent via a second forward link to the vehicle 102x. The first forward link and the second forward link may each be supported by a different communication link on a different frequency band, and thus the first transmission and the second transmission may each be formatted using a different protocol. For example, a first portion of the obtained data may be caused to be sent to the vehicle 102x over the satellite forward link 108b, and a second portion of the obtained data may be caused to be sent to the vehicle 102x over the ATG forward link 108a. In an embodiment, the bandwidth or speed of the first forward link may be two times greater than that of the second forward link, three times greater, four times greater, five times greater, six times greater, seven times greater, or greater by a factor larger than seven.

In some embodiments of the method 280, at least one of the contents of the first portion of the obtained data or the contents of the second portion of the obtained data may be selected. In an embodiment, the contents of the first or the second portion may be selected based on a content type. For example, if the obtained content is a web page to be displayed at a screen of the target device 118, for an optimal user experience, a user desires to see some progress of the loading of the web page. Accordingly, critical elements of the web page (e.g., CSS, HTML, Java script, and other structural elements) may be selected to be delivered to the vehicle 102x by a faster forward link (e.g., the ATG forward link 108a) so that these critical elements may be received as soon as possible at the device 118 to begin establishing the web page framework, and to demonstrate to the user that some progress is occurring. On the other hand, larger-sized elements of the web page (e.g., image, video, flash, etc.) may arrive at the user device after the critical elements, and may be inserted into the already-established webpage framework. These larger elements, although not as time-critical to the user experience, nonetheless require high bandwidth due to their size and density and, as such, may be selected to be delivered to the vehicle 102x by a high-bandwidth forward link (e.g., the satellite forward link 108b).

Generally, the more time sensitive portions (e.g., portions that require a low round trip delay time) of an obtained content may be selected to be delivered over a faster forward link (as compared to other available forward links 108), the higher density or larger-sized portions of the obtained content may be selected to be delivered over a higher capacity forward link (as compared to other available forward links 108), the portions of the obtained content that require a greater degree of accuracy may be selected to be delivered over a more robust forward link (as compared to other available forward links 108), etc. In some situations, a particular content type may be exclusively assigned to one particular type of forward link for delivery, and optionally may be assigned to a back-up type of forward link if the primary forward link is unavailable. In some situations, a particular content type may be assigned to multiple types of forward links, optionally with a priority order of selection, e.g., the highest priority, available forward link is selected for delivery of the certain content type.

In still another example, within a given forward link, certain types of data may be given priority over other types of data. For instance, in a satellite forward link, overflow data from an ATG forward link may be given higher priority than data that has been originally mapped to the satellite forward link, as the overflow ATG traffic may generally be more time sensitive than the satellite traffic.

In some embodiments of the method 280, a particular forward link may be selected for a particular type of content data further based on other criteria, such a dynamic characteristic or status of one or more forward links, or on a characteristic of the obtained content as a whole. For example, when the obtained content is a streaming video, streaming media coded picture frames (e.g., I-frames) may be assigned or selected to be delivered over the ATG forward link 108a, while the corresponding streaming media predictive frames (e.g., P-frames, B-frames) may be assigned or selected to be delivered over a $K_a$ satellite frequency band. However, the bandwidth allocated for any particular stream within the $K_a$ band may be capped at a certain level. If the streaming media content reaches the cap within the $K_a$ band, subsequent predictive frames of the stream may be delivered via another forward link, e.g., the L satellite frequency band. In another example, a particular type of content data may be assigned or selected to be delivered over an ATG forward link 108a, and when the ATG forward link is at a pre-defined capacity, overflow of the particular type of content data may be assigned or selected to be delivered over the satellite forward link 108b. In another example, any data stream greater than a certain size may be automatically mapped to be distributively delivered over all available satellite forward links.

In an embodiment, the selection of a particular forward link may be based, at least in part, based on feedback data or information received from the vehicle 102x. Feedback information or data may be indicative of a current quality, capacity, or availability of one or more forward links, e.g., as previously described with respect to FIGS. 2-5. The data center 105 or the hybrid communications distributor 104 may receive feedback data or information via a reverse link, and may select a subsequent forward link for transmission of a particular portion of obtained content at least partially based on the received feedback information or data, in an embodiment.

Thus, as illustrated by the examples, portions of the content data may be mapped to various forward links based on many levels of granularity and differentiation criteria. For example, as previously indicated, mapping of different portions of content data to different forward links may be based on content type. Mapping may additionally or alternatively be based on a type of application to which the obtained content is to be delivered, and/or based on a stream size in which the obtained content is included. Still additionally or alternatively, mapping of portions of the obtained content to various forward links may be based on, for example, socket types or availability of sockets, a level of service paid for by or otherwise assigned to a user of the recipient device, a quality and/or an availability of various forward links, dynamic resource allocation algorithms, etc. Further, mapping of portions of the obtained content to various forward links may be additionally or alternatively performed at different levels, e.g., at an application level, a packet level, a stream level, a level based on geographical location, a level based on a characteristic of an account of the user, or a level of service acquired by the user.

In an embodiment, the mapping of certain content types to certain forward links are determined a priori and the mappings are stored in a file or other data storage entity that is accessible to the data center 105 or to the hybrid communications distributor 104. In some embodiments, a particular forward link may be selected for a particular type of data content based on the a priori mapping. The mappings of content portions and forward links may be configurable, in an embodiment.

With further regard to the method 280, similar to the each of the methods 200, 220, 240 and 260, any of the forward transmissions over any of the forward links 108 may include multiplexed contents or portions of contents that are to be delivered to the device 118 and/or to other devices being transported on the vehicles 102. Similarly, each of the methods 200, 220, 240, 260 and 280 may multicast any forward transmission over any forward link 108, as desired.

Figure 8:
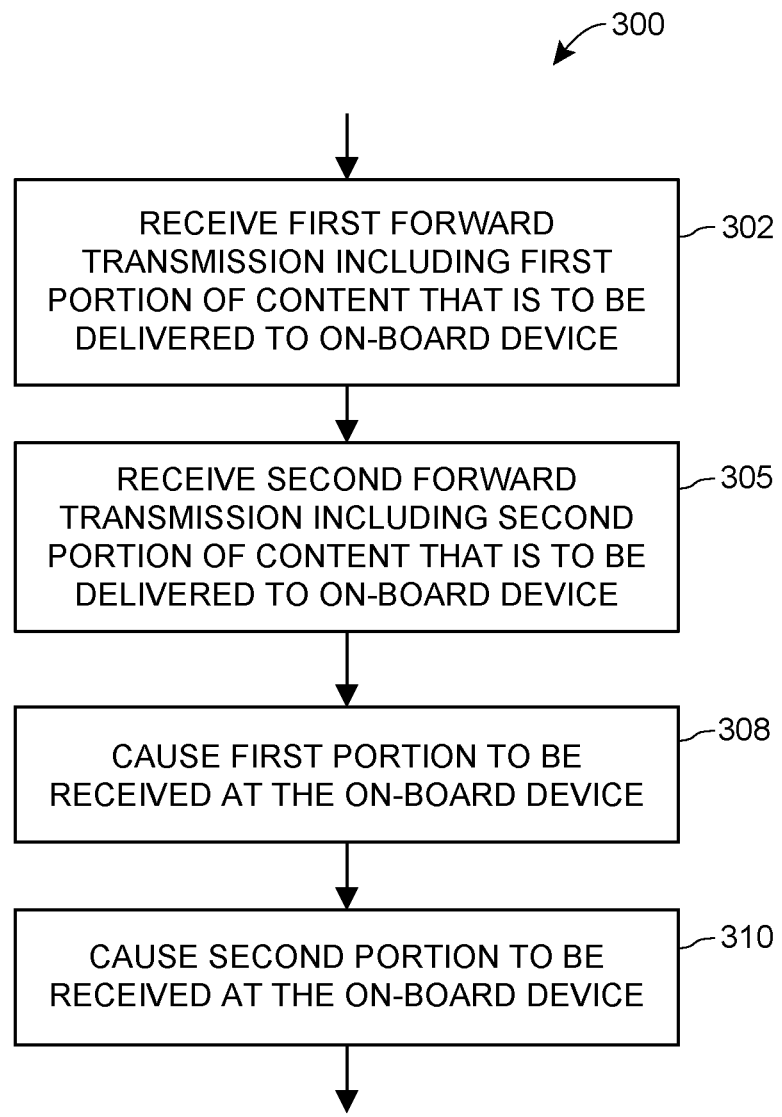
FIG. 8 illustrates an embodiment of a method for delivering content in a distributed or hybrid manner to a device that is on-board a vehicle.

FIG. 8 illustrates an example method 300 for distributively delivering content to devices being transported by vehicles. In an embodiment, the method 300 is performed at least in part by the hybrid communications system 100 of FIG. 1, although some or all of the method 300 may be performed by a communications system other than the system 100. In an embodiment, at least a portion of the method 300 is performed by the on-board node 120 at the vehicle 102x, by the hybrid communications collector 122 included in the on-board node 120, by a recipient device 118, or by an application executing on the recipient device 118 such as the VTA. In an embodiment, the method 300 may operate in conjunction with at least a part of one or more of the methods described in FIGS. 2-5 and 7, and/or with the data tunnel 600 of FIG. 6. For ease of discussion, the method 300 is described below with simultaneous reference to FIGS. 1-7, however, this description is only one of many embodiments and is understood to be non-limiting. Additionally, for ease of discussion only and not for limitation purposes, the method 300 is described below in the context of an example scenario in which data is to be delivered to a device 118 that is on-board a particular vehicle 102x of a plurality of vehicles 102.

At block 302, a first transmission including a first portion of content that is to be received, as a whole by the on-board device 118, is received at the vehicle 102x. For example, the on-board node 120, the hybrid communications collector 122, the device 118 or an application on the device 118 (e.g., the VTA) receives the first portion of the content. In an embodiment, the content that is to be received, as a whole by the device 118, is to be presented, as a whole, at a user interface of the device 118. For example, the content that is to be presented as a whole at the user interface of the device 118 may be a web page, streaming video, a response to a request from a user of the device 118, or any other type of content that is to be delivered to the device 118 such as previously discussed with respect to FIGS. 1-7. The first portion of the content may be received onto the vehicle 102x via a first modem connected to a first forward link (e.g., one of the forward links 108) that is supported by a first wireless frequency band, and the first portion of the content may be received in conjunction with an indication of the device 118 to which the first portion of the content is to be delivered.

At block 305, a second transmission including a second portion of content that is to be received, as a whole by the on-board device 118, is received at the vehicle 102x. For example, the on-board node 120, the hybrid communications collector 122, the device 118 or an application on the device 118 (e.g., the VTA) receives the second portion of the content. The second portion of the content may be received onto the vehicle 102x via a second modem connected to a second forward link (e.g., another forward link from the set of forward links 108) that is supported by a second wireless frequency band different than the first wireless frequency band. The second portion of the content may be received in conjunction with an indication of the device 118 to which the second portion of the content is to be delivered.

In an embodiment, the first forward link, the second forward link, the first portion of the content, and/or the second portion of the content may have been selected. For example, the first forward link, the second forward link, the first portion of the content, and/or the second portion of the content may have been selected by the data center 105 or by the hybrid communications distributor 104 based on the criteria for forward link and/or content portion selection as previously described with respect to FIG. 7, or based on other criteria.

In an embodiment, based on the indication of the device 118 included in the first forward transmission, the hybrid communications collector 122 may determine whether or not the device 118 to which the first portion of the content is to be delivered is currently on-board the vehicle 102x. If the device to which the first portion of the content is to be delivered is determined to be not on-board the vehicle 102x, no further processing on the first forward transmission may be performed at the vehicle 102x. If the device to which the first portion of the content is to be delivered is determined to be on-board the vehicle 102x, e.g., the device 118, the method 300 may include causing the content of the first received transmission to be sent to the recipient or target device 118 via one or more communication networks contained within the vehicle 102x (block 308). For example, if the device 118 is a mobile computing device connected to a Wi-Fi network on-board the vehicle 102x, the hybrid communications collector 122 may include the first portion of the content in an IEEE 802.11 compatible transmission, and may cause the transmission to be delivered over the on-board Wi-Fi network to the device 118. Other examples of on-board data delivery other than Wi-Fi, though, are additionally or alternatively possible. Indeed, the method 300 may use any means and/or techniques of delivering the received content to an on-board device, such as any of the means and/or techniques described in the aforementioned co-pending U.S. patent application Ser. No. 13/675,200.

With regard to the second forward transmission, in an embodiment, based on the indication of the device 118 included in the second forward transmission, the hybrid communications collector 122 may determine whether or not the device 118 to which the second portion of the content is to be delivered is currently on-board the vehicle 102x. If the device to which the second portion of the content is to be delivered is determined to be not on-board the vehicle 102x, no further processing on the second forward transmission may be performed at the vehicle 102x. If the device to which the second portion of the content is to be delivered is determined to be on-board the vehicle 102x, e.g., the device 118, the method 300 may include causing the content of the second received transmission to be sent to the recipient or target device 118 via one or more communication networks contained within the vehicle 102x (block 310). For example, if the device 118 is a mobile computing device connected to a Wi-Fi network on-board the vehicle 102x, the hybrid communications collector 122 may include the second portion of the content in an IEEE 802.11 compatible transmission, and may cause the transmission to be delivered over the on-board Wi-Fi network to the device 118. Other examples of on-board data delivery other than Wi-Fi, though, are additionally or alternatively possible. Indeed, the method 300 may use any means and/or techniques of delivering the received content to an on-board device, such as any of the means and/or techniques described in the aforementioned co-pending U.S. patent application Ser. No. 13/675,200.

In an embodiment, the first external forward link 108 and the forward link of the on-board communication network to which the device 118 is connected (e.g., the on-board Wi-Fi network or other suitable network) support a first data communication tunnel established by the data center 105 (or by the hybrid communications distributor 104 included in the data center 105). For example, the first forward link and the forward link of the on-board Wi-Fi network to the device 118 support a first data tunnel forward link similar to the data tunnel forward link 610 of FIG. 6, and the first portion of the content is delivered to the device 118 using the first data tunnel forward link.

In an embodiment, the second external forward link 108 and the on-board forward link to which the device 118 is connected (e.g., the on-board Wi-Fi network or other suitable network) support a second data communication tunnel established by the data center 105 (or by the hybrid communications distributor 104 included in the data center 105) that is distinct and separate from the first data communication tunnel. For example, the second external forward link 108 and the second on-board forward link to the device 118 support a second data tunnel forward link 610, and the second portion of the content is delivered to the device 118 using the second data tunnel forward link. In this embodiment, the device 118 or an application at the device 118 (e.g., the VTA) may assemble the first portion and the second portion to form the content as a whole at the device 118, in some cases, over time. For example, the device 118 or the application at the device 118 may first receive the first portion of the content, and begin presenting the first portion of the content at a user interface of the device. When the second portion of the content is received, the device 118 or the application at the device 118 may add the second portion of the content to the presented first portion so that the content as a whole is presented at the user interface of the device.

In an embodiment, rather than the device 118 (or an application thereon) serving as the on-board endpoints of the two established data tunnels to the data center 105, the on-board device 120 or the hybrid communications collector 122 of the on-board device 120 serves as the on-board endpoints of two established data tunnels to the data center 105 (where one of the two established data tunnels delivers the first portion of the content to be delivered to the device 118, and the other one of the two established data tunnels delivers the second portion of the content). In this embodiment, rather than the device 118 (or an application thereon) collecting and assembling the content as a whole, the on-board device 120 or the hybrid communications collector 122 collects and assembles the content as a whole, and causes the assembled content to be delivered to the device 118, e.g., via an on-board communication network.

In an embodiment, the on-board node 120, the hybrid communications collector 122, the device 118, or an application on the device 118 may cause feedback information or data to be sent, via a reverse link 110, from the vehicle 102x to the data center 105. Feedback information or data may correspond to the received first portion of the content and/or to the received second portion of the content, for example.

In an embodiment, the feedback information or data may be indicative of a current quality, capacity, or availability of one or more forward links and/or of one or more reverse links, e.g., as previously described with respect to FIGS. 2-7.

Thus, as discussed above, a hybrid communications system, such as the example hybrid communications system 100, may allow transmission of data and information to devices on-board a vehicle using a forward link and a reverse link, each of which may be supported by a different frequency band and each of which may utilize a different communication protocol. The forward link may differ in frequency band, hardware configuration, protocol, spectrum, etc., as compared with the reverse link corresponding to the reverse direction. In an embodiment, the bandwidth and/or the speed of the forward link may be greater than (and in some cases, significantly greater than) the bandwidth and/or the speed of the reverse link to allow for efficient use of spectrum and modem resources, and for decreased data delivery times. In an embodiment, forward transmissions may be multiplexed and/or multicast. Selection of a forward link for a subsequent transmission may be based on feedback information received via the reverse link, and in some cases, may also be based on a type of the content that is to be delivered. In an embodiment, a hybrid communications system, such as the example hybrid communications system 100, may utilize multiple different forward links to deliver content as a whole between a device that is on-board a vehicle and a data center. Selection of portions of contents and/or of the multiple forward links may be based on a content type and optionally other criteria.

Figure 9:
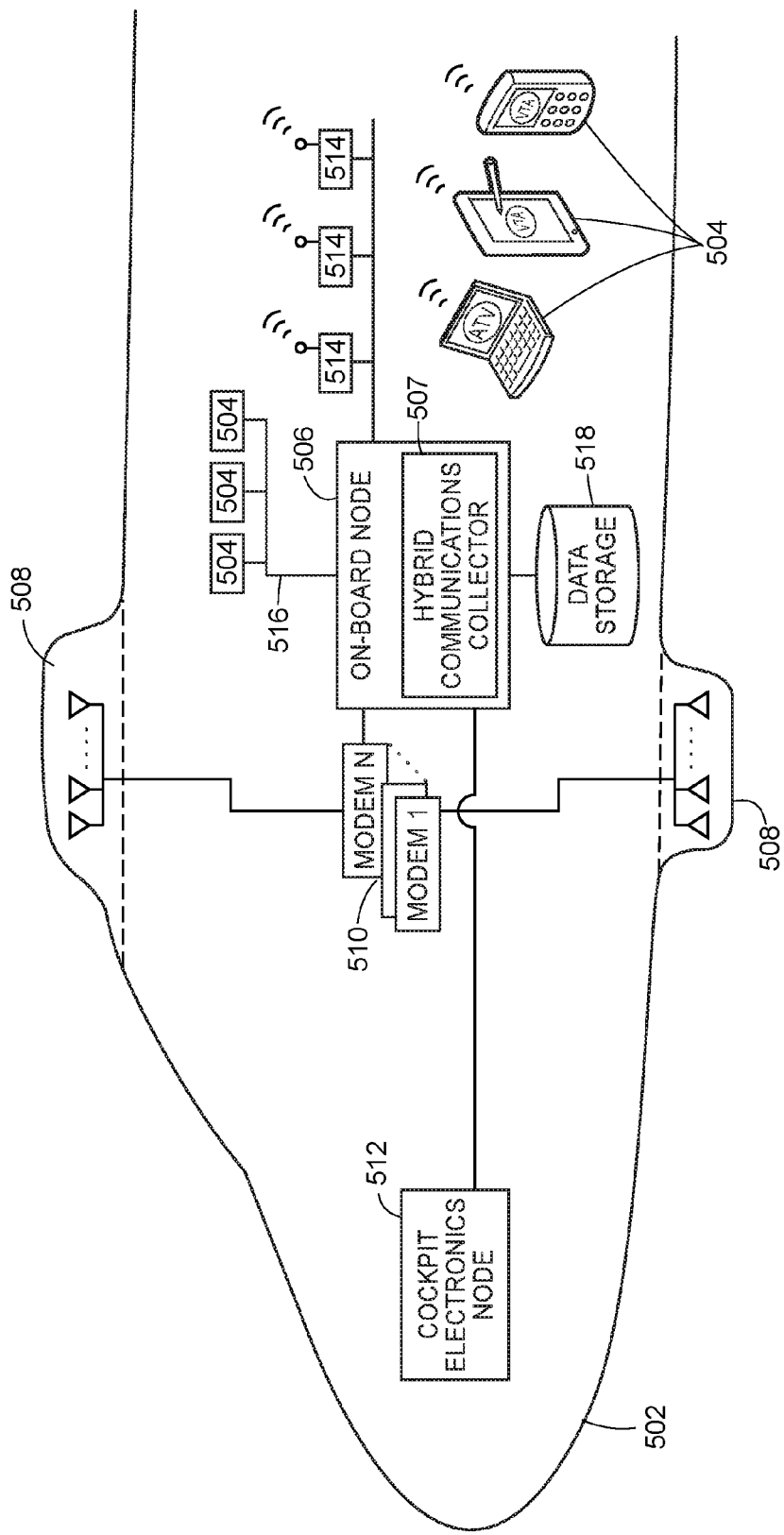
FIG. 9 is a block diagram of an example system contained within a vehicle that is configured to receive hybrid communications or data onto the vehicle and deliver the received information or data to a recipient device that is on-board the vehicle.

FIG. 9 illustrates an example on-board system 500 in a vehicle 502 that may receive information or data onto the vehicle 502 (e.g., information or data provided by the data center, the hybrid communications distributor 104, or other suitable information distributor), and that may cause feedback information to be delivered from the vehicle 502, e.g., to the data center 105 or the hybrid communications distributor 104. Further, the on-board system 500 may cause data to be delivered to and/or received from one or more devices 504 being transported by the vehicle 502. In an embodiment, the vehicle 502 is the vehicle 102x, and the one or more devices 504 is one of the devices 118.

The example on-board system 500 includes an on-board node 506, such as an Auxiliary Computer Power Unit (ACPU), that may be a computing device communicatively connected to one or more external communication links via one or more antennas 508 and one or more modems or transceivers 510. In an embodiment, the on-board node 506 may be the on-board node 120, and may include an instance of the hybrid communications collector 122, which is represented in FIG. 9 by the block 507.

Each of the one or more antennas 508 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band. Each of the antennas 508 may be communicatively connected to an associated modem or transceiver 510 that is fixedly connected to the vehicle 502 and is configured to encode and decode information and data corresponding to signals at the respective antenna 508, in an implementation. The one or more modems or transceivers 510 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 510 may include a respective modem or transceiver that is compatible with EVDO (Evolution Data Optimized) or Wi-Fi communications technologies. It is clear, however, that the on-board system 500 may include any number of antennas 508 and any different number of associated modems or transceivers 510 to support any desired number of different wireless communication technologies.

In addition, when the vehicle 502 is an aircraft, a cockpit electronics node 512 may be communicatively coupled to the one or more modems 510. The cockpit electronics node 510 may be a LRU configured to collect electronic information from various instruments in the cockpit of the aircraft, e.g., during flight. In some cases, the cockpit electronics node 510 may provide collected flight information such as altitude, airspeed, aircraft position, or other flight state information to the hybrid communications obtainer 507, the on-board node 506, or directly to the vehicle data distribution network 106, e.g., via a designated return link.

At least some of the devices 504 may be mobile computing devices such as smartphones, tablet computers, laptop computers, personal digital assistants, e-readers, etc. that are capable of establishing a wireless communicative connection with the hybrid communications obtainer 507 via one or more wireless access points 514, e.g., via a wireless network interface. Some of the devices 504 may be wired computing devices that are communicatively connected to the on-board node 506 via a wired network 516.

In some implementations, one or more of the devices 504 may be an on-board data storage entity 518 that may store various types of data which may be distributed to and/or received from other devices 504, e.g., entertainment content, web pages, account information, usage data, applications that may be installed, information identifying the devices 504, payment information (e.g., encrypted financial account information), digital rights management (DRM) keys, and/or any other data that is desired to be stored, at least temporarily, on-board the vehicle 502.

In an embodiment, each of devices 504 may include an instance of a vehicle travel application (VTA) installed thereon and particularly configured to support services while the device 504 is being transported by the vehicle 504, e.g., when the vehicle 504 is traveling en route between ports. For example, the vehicle travel application may be configured to serve as the on-board end of a data tunnel that is established with the data center 105 or with the hybrid communications distributor 104 at the data center. In an embodiment, the vehicle travel application may communicate with other applications installed on a particular device 504 (e.g., native terrestrial applications) so that the other applications may operate as desired (e.g., in a native manner) while the device 504 is being transported by the vehicle 502.

Figure 10:
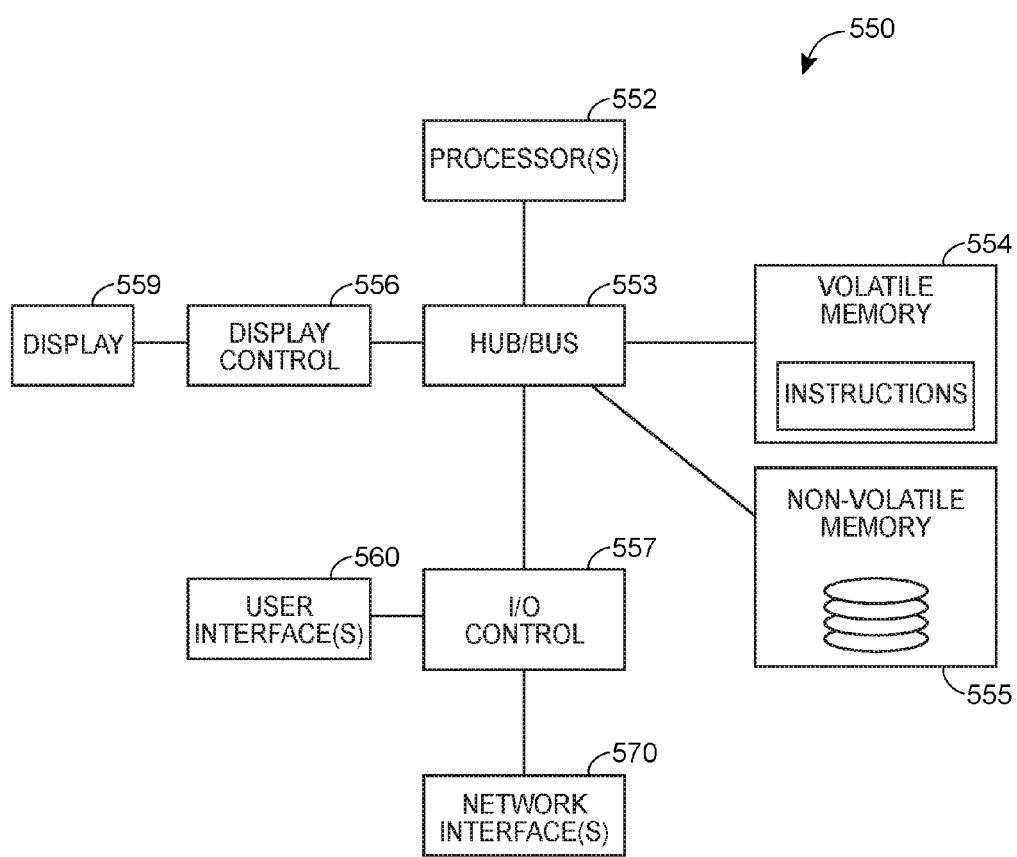
FIG. 10 is a block diagram of an example computing device that may be utilized in a hybrid communications system.

FIG. 10 illustrates a block diagram of an example computing device 550 that may be utilized in the hybrid communications system 100. For example, one or more computing devices 550 may be particularly configured to be utilized as at least a portion of the data center 105, the vehicle data delivery network 106, the on-board node 120, or the device 118. Additionally, other devices illustrated in FIGS. 1 and 5 such as the cockpit electronics node 512 may include an embodiment of the computing device 550.

The computing device 550 may include, for example, one more central processing units (CPUs) or processors 552, and one or more busses or hubs 553 that connect the processor(s) 552 to other elements of the computing device 550, such as a volatile memory 554, a non-volatile memory 555, a display controller 556, and an I/O controller 557. The volatile memory 554 and the non-volatile memory 555 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 554 and/or the memory 555 may store instructions 558 that are executable by the processor 552. For example, in a computing device particularly configured to be included in the data center 105, the instructions 558 may be the instructions comprising the hybrid communications distributor 104. In another example, in a computing device 550 particularly configured to be the on-board node 120, the instructions 558 may be the instructions comprising the hybrid communications collector 122. In yet another example, in a computing device 550 particularly configured to be a device 118, the instructions 558 may be the Vehicle Travel Application (VTA). Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 554, 555 stores a subset of the modules and data structures identified herein. In other embodiments, at least one of the memories 554, 555 stores additional modules and data structures not described herein.

In an embodiment, the display controller 556 may communicate with the processor (s) 552 to cause information to be presented on a connected display device 559. In an embodiment, the I/O controller 557 may communicate with the processor(s) 552 to transfer information and commands to/from the user interface 560, which may include a mouse, a keyboard or key pad, a touch pad, click wheel, lights, a speaker, a microphone, etc. In an embodiment, at least portions of the display device 559 and of the user interface 560 are combined in a single, integral device, e.g., a touch screen. Additionally, data or information may be transferred to and from the computing device 550 via a network interface 570. In some embodiments, the computing device 550 may include more than one network interface 570, such as a wireless interface and a wired interface.

The illustrated computing device 550 is only one example of a computing device suitable to be particularly configured for use in the hybrid communications system 100. Other embodiments of the computing device 550 may be also be for use in the hybrid communications system 100, even if the other embodiments have more or fewer components than shown in FIG. 10, have one or more combined components, or have a different configuration or arrangement of the components. Moreover, the various components shown in FIG. 10 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method of distributively delivering content to devices being transported by vehicles, comprising: obtaining, at an hybrid communications distributor disposed in a terrestrial location, content that is to be delivered to a device, the device being a mobile computing device that is temporarily being transported by a vehicle that is in-flight; selecting, at a processor of the hybrid communications distributor, at least one of a first forward link included in a first wireless communication link supported by a first frequency band or a second forward link included in a second wireless communication link supported by a second frequency band; causing, by the hybrid communications distributor, a first transmission to be sent to the in-flight vehicle using the first forward link, the first transmission including a first portion of the content; and causing, by the hybrid communications distributor, a second transmission to be sent to the in-flight vehicle using the second forward link, the second transmission including a second portion of the content.

2. The method of the preceding aspect, wherein selecting the at least one of the first forward link or the second forward link comprises selecting the at least one of the first forward link or the second forward link based on a type of data that is included in one of the first portion of the content or the second portion of the content and that is excluded from the other one of the first portion of the content or the second portion of the content.

3. The method of any one of the preceding aspects, wherein selecting the at least one of the first forward link or the second forward link comprises selecting the at least one of the first forward link or the second forward link based on a size of a data stream in which the content is included.

4. The method of any one of the preceding aspects, wherein selecting the at least one of the first forward link or the second forward link comprises selecting the at least one of the first forward link or the second forward link based on at least one of: a current capacity of the first wireless communication link; a current capacity of the second wireless communication link; a current availability of the first wireless communication link; a current availability of the second wireless communication link; a transmission quality of the first wireless communication link; or a transmission quality of the second wireless communication link.

5. The method of any one of the preceding aspects, wherein selecting the at least one of the first forward link or the second forward link comprises selecting the at least one of the first forward link or the second forward link based on at least one of a time requirement for delivery of the first portion or a time requirement for delivery of the second portion.

6. The method of any one of the preceding aspects, further comprising selecting at least one of the first portion of the content or the second portion of the content based on at least one of: a type of data that is to be included in one of the first portion of the content or the second portion of the content and that is to be excluded from the other one of the first portion of the content or the second portion of the content; a time requirement for delivery of the type of data; an application corresponding to the content; a user of the device; or a socket used by the first communication link or by the second communication link.

7. The method of any one of the preceding aspects, wherein the content to be delivered to the device is first content, and wherein the method further comprises: multiplexing the first portion of the first content with other content to be delivered to the device or to another device that is temporarily being transported by the in-flight vehicle; and including, in the first transmission sent to the in-flight vehicle, the multiplexed contents.

8. The method of any one of the preceding aspects, wherein multiplexing the first portion of the content with the other content comprises multiplexing the first portion of the content and the other content at at least one of: an application level, a packet level, a stream level, a level based in geographical location, or a level corresponding to a user of the device.

9. The method of claim 1, wherein at least one of: (i) causing the first transmission to be sent to the in-flight vehicle using the first forward link included in the first communication link supported by the first frequency band comprises causing the first transmission to be sent to the in-flight vehicle using a forward link that is at least one of: an L band communication link, a Ku band communication link, a Ka communication link, a Wi-Fi communication link, a WiMAX communication link, a communication link supported by one or more satellites, or a communication link supporting a broadband protocol; or (ii) causing the second transmission to be sent to the in-flight vehicle using the second forward link included in the second communication link supported by the second frequency band comprises causing the second transmission to be sent to the in-flight vehicle using a forward link of an air-to-ground (ATG) communication link that is configured to deliver data directly between the in-flight vehicle an terrestrial ground stations while the in-flight vehicle is in-flight.

10. The method of any one of the preceding aspects, wherein obtaining the content that is to be delivered to the device comprises obtaining content that includes at least one of: information that is to be presented, as a whole, on a user interface of the device; a web page; a response to a request generated at the device; or streaming data.

11. A system for distributively delivering content to devices that are being transported by vehicles, the system configured to perform none or any one of the preceding aspects, and the system comprising: a hybrid communications distributor that is communicatively connected to a vehicle via a plurality of forward links while the vehicle is in-flight, where each forward link of the plurality of forward links uses a different respective wireless communication protocol. The hybrid communications distributor may include one or more processors and one or more non-transitory, tangible computer-readable storage media storing computer-executable instructions. The computer-executable instructions, when executed by the one or more processors, may cause the hybrid communications distributor to obtain content that is to be presented, as a whole, at a user interface of a device being transported by the in-flight vehicle. Additionally, the computer-executable instructions, when executed by the one or more processors, may cause the hybrid communications distributor to cause a first transmission to be sent to the in-flight vehicle using a first forward link of the plurality of forward links, the first forward link included in a first communication link, and the first transmission including a first portion of the content that is to be presented, as a whole, at the user interface of the device. Further, the computer-executable instructions, when executed by the one or more processors, may cause the hybrid communications distributor to cause a second transmission to be sent to the in-flight vehicle using a second forward link of the plurality of forward links, the second forward link included in a second communication link, and the second transmission including a second portion of the content that is to be presented, as a whole, at the user interface of the device.

12. The system of any one of the preceding aspects, wherein the computer-executable instructions, when executed by the one or more processors, cause the hybrid communications distributor further to select at least one of the first forward link or the second forward link based on a type of data that is included in one of the first portion of the content or the second portion of the content, and that is excluded from the other one of the first portion of the content or the second portion of the content.

13. The system of any one of the preceding aspects, wherein one or more associations between particular types of data and particular forward links are predetermined, and wherein the selection of the at least one of the first forward link or the second forward link is based on the one or more associations.

14. The system of any one of the preceding aspects, wherein the selection of the at least one of the first forward link or the second forward link is further based on: a size of a data stream in which the content is included; at least one of a current capacity, a current availability, or a current transmission quality of the first communication link; at least one of a current capacity, a current availability, or a current transmission quality of the second communication link; or feedback information received by the hybrid communications distributor, the feedback information corresponding to a previous forward transmission.

15. The system of any one of the preceding aspects, wherein the computer-executable instructions, when executed by the one or more processors, cause the hybrid communications distributor further to multiplex, at at least one of an application level, a packet level, a stream level, or a user level, the first portion of the content to be delivered to the device with other content to be delivered to the device or to another device being transported by the in-flight vehicle; and include the multiplexed contents in the first transmission that is caused to be sent to the in-flight vehicle using the first forward link.

16. The system of any one of the preceding aspects, wherein each forward link included in the plurality of forward links is supported by a different frequency band selected from: an L frequency band, a Ku frequency band; a Ka frequency band; a first other frequency band allocated to support satellite communications, a second other frequency band allocated to support another wireless broadband communication protocol; or a frequency band allocated for direct wireless communications between in-flight vehicles and ground stations.

17. The system of any one of the preceding aspects, wherein the computer-executable instructions, when executed by the one or more processors, cause the hybrid communications distributor further to cause a third transmission to be sent to the in-flight vehicle using a third forward link of the plurality of forward links, the third forward link included in a third communication link, and the third transmission including a third portion of the content that is to be presented at the user interface of the device.

18. A method of receiving distributed content at devices being transported by vehicles, the method including none or any one of the preceding aspects, and the method comprising: receiving, at a vehicle via a first forward link of a plurality of forward links configured to wirelessly deliver data to the vehicle, a first transmission including a first portion of information that is to be displayed, as a whole, at a user interface of a device, the device being a mobile computing device that is temporarily being transported by a vehicle, and the first forward link included in a first wireless communication link supported by a first frequency band; causing, by a processor of a hybrid communications collector fixedly connected to the vehicle, the first portion of the information that is to be displayed, as a whole, at the user interface of the device to be sent to the device using a wireless network contained within the vehicle; receiving, at the vehicle via a second forward link of the plurality of forward links, a subsequent transmission including a second portion of the information that is to displayed at a user interface of the device; and causing, by the processor of the hybrid communications collector, the second portion of the information that is to be displayed, as a whole, at the user interface of the device to be sent to the device using the wireless network contained within the vehicle. The first portion of the information to be displayed at the user interface of the device may be a first selected portion, the second portion of the information to be displayed at the user interface of the device may be a second selected portion, the first forward link may be a first selected forward link, and/or the second forward link may be a second selected forward link.

19. The method of any one of the preceding aspects, wherein receiving the first portion of the information that is to be displayed, as a whole, at the user interface of the device comprises receiving a first portion of at least one of: a web page, a response to a request received at the user interface of the device, or streaming data.

20. The method of any one of the preceding aspects, further comprising causing, by the hybrid communications collector, feedback information corresponding to at least one of the first transmission or the second transmission to be sent from the vehicle using a reverse link.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A method of distributively delivering content to devices being transported by vehicles, the method comprising:
   mapping, to a respective forward link of a plurality of forward links, each portion of a plurality of portions of a content that is requested, via a user interface of a device, to be delivered to the device for display, as a whole, at the user interface of the device, the device being transported by a vehicle that is in-flight, the mapping based on a respective content type of at least one portion of the requested content, and wherein mapping a first portion of the plurality of portions of the requested content to the respective forward link corresponding to the first portion is based on one of a first type of data included in the first portion, or a second type of data included in a second portion of the plurality of portions of the requested content; and
   causing respective transmissions of the plurality of portions of the requested content to be sent to the in-flight vehicle using the respective forward links indicated by the mapping.

2. The method of claim 1, wherein the first portion of the requested content excludes the second type of data and the second portion of the requested content excludes the first type of data.

3. The method of claim 1,
   further comprising selecting a particular forward link included in at least one forward link mapped to a particular portion of the requested content; and
   wherein causing the respective transmissions of the plurality of portions of the requested content to be sent to the in-flight vehicle using the respective forward links indicated by the mapping comprises causing the particular portion of the requested content to be sent to the in-flight vehicle using the selected, particular forward link.

4. The method of claim 3, wherein mapping the particular portion of the requested content to the at least one forward link is based on a first criteria, and wherein selecting the particular forward link included in the at least one forward link is based on a second criteria different than the first criteria.

5. The method of claim 1, wherein mapping the each portion of the requested content is further based on at least one of: a type of application executing on the device and to which the requested content is to be delivered, a level of an on-board data service corresponding to the device, or a characteristic of an account corresponding to a user of the device.

6. The method of claim 1, wherein mapping the each portion of the requested content is further based on a size of a data stream in which the requested content is included.

7. The method of claim 1, wherein mapping the each portion of the requested content is further based on at least one of: a respective current capacity of at least one of the plurality of forward links, a respective current availability of the at least one of the plurality of forward links, a respective transmission quality of the at least one of the plurality of forward links, an availability of a socket corresponding to one of the plurality of forward links, a delivery time requirement, or a dynamic resource allocation algorithm.

8. The method of claim 1, wherein mapping the each portion of the requested content is performed at one or more of an application level, a packet level, or a stream level of a data stream in which the requested content is included.

9. The method of claim 1, wherein mapping one or more portions of the requested content is based on a type of socket corresponding to at least one of the plurality of forward links.

10. The method of claim 1, wherein causing the respective transmissions of the plurality of portions of the requested content to be sent to the in-flight vehicle using the respective forward links comprises:
   causing a first transmission to be sent to the in-flight vehicle using a first forward link, the first forward link comprising at least one of: a satellite communication link, an air-to-ground (ATG) communication link configured to deliver data directly between the in-flight vehicle and terrestrial ground stations, a communication link operating over a frequency band allocated for use by a protocol corresponding to the IEEE 802.11 standard, a communication link supporting a broadband protocol, or a communication link supporting a terrestrial cellular communication protocol; and causing a second transmission to be sent to the in-flight vehicle using a second forward link different than the first forward link.

11. A method of distributively delivering content to devices being transported by vehicles, the method comprising:

receiving, at a vehicle that is in-flight, a plurality of portions of a content that has been requested via a user interface of a device on-board the vehicle, and that is to be delivered to the device on-board the vehicle for display, as a whole, at the user interface of the device, each portion of the plurality of portions received via a respective forward link of a plurality of forward links, at least one of the respective forward links selected based on a respective content type of a corresponding portion of the requested content, and wherein a particular forward link included in the at least one of the respective forward links is selected based on one of a first type of data included within a first portion of the plurality of portions of the requested content or a second type of data included in a second portion of the plurality of portions of the requested content; and causing the plurality of portions of the requested content to be delivered via an on-board wireless network to the device for display, as a whole, at the user interface of the device.

12. The method of claim 11, wherein:

receiving, at the vehicle that is in-flight, the plurality of portions of the requested content comprises:

receiving the first portion of the requested content via the particular forward link, the particular forward link included in a first wireless communication link; and receiving the second portion of the requested content via another forward link included in a second wireless communication link different from the first wireless communication link; and each of the first communication link and the second communication link is selected from set of communication links including at least two of: a satellite communication link, an air-to-ground (ATG) communication link configured to deliver data directly between the in-flight vehicle and terrestrial ground stations, a communication link operating over a frequency band allocated for use by a protocol corresponding to the IEEE 802.11 standard, a communication link supporting a broadband protocol, or a communication link supporting a terrestrial cellular communication protocol.

13. The method of claim 11, wherein a first forward link of the plurality of forward links is included in a data communication tunnel disposed between a ground communications system and the in-flight vehicle, and wherein causing the plurality of portions of the requested content to be delivered to the device comprises causing the first portion of the requested content to be delivered to the device using the data communication tunnel.

14. The method of claim 13, wherein:

the data communication tunnel is a first data communication tunnel;

a second forward link of the plurality of forward links is included in a second data communication tunnel disposed between the ground communications system and the in-flight vehicle; and causing the plurality of portions of content to be delivered to the device comprises causing the second portion of the requested content to be delivered to the device using the second data communication tunnel.

15. The method of claim 13, wherein an on-board endpoint of the data communication tunnel is established at the device, and wherein the method further comprises assembling, at the device, the first portion of the requested content with other portions of the requested content for display, as a whole, at the user interface of the device.

16. The method of claim 13, wherein an on-board endpoint of the data communication tunnel is established at a hybrid communications collector communicatively disposed between the first forward link and the on-board wireless network, and wherein the method further comprises assembling, at the communications collector, the first portion of the requested content with other portions of the requested content for display, as a whole, at the user interface of the device.

17. The method of claim 11, wherein receiving the plurality of portions of the requested content that is to be delivered to the device comprises receiving a plurality of portions of a webpage, a response to a request generated at the device, streaming data, or other information that is to presented, as a whole, at the user interface of the device.

18. The method of claim 11, wherein the at least one of the respective forward links is selected further based on at least one of:

a type of application executing on the device and to which the requested content is to be delivered, a level of on-board data service corresponding to the device, a characteristic of an account corresponding to a user of the device, respective time requirements for delivery of one or more portions of the requested content, or a type of socket.

19. The method of claim 11, wherein the at least one of the respective forward links is selected further based on at least one of:

a respective current capacity of the at least one of the respective forward links, a respective current availability of the at least one of the respective forward links, a respective transmission quality of the at least one of the respective forward links, an availability of a socket, a dynamic resource allocation algorithm, or a size of the data stream in which the requested content is included.

* * * * *